United States Patent
Endo et al.

(10) Patent No.: US 6,836,267 B1
(45) Date of Patent: Dec. 28, 2004

(54) COORDINATE INPUT DEVICE AND A PROCESSOR READABLE MEDIUM

(75) Inventors: Michiko Endo, Tokyo (JP); Takeshi Nishino, Tokyo (JP); Yasuo Ootani, Tokyo (JP); Norio Endo, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 0 days.

(21) Appl. No.: 09/455,020

(22) Filed: Dec. 6, 1999

(30) Foreign Application Priority Data

Apr. 23, 1999 (JP) ............................................. 11-116835
Sep. 28, 1999 (JP) ............................................. 11-274665

(51) Int. Cl.$^7$ .................................................. G09G 5/00
(52) U.S. Cl. ........................................ 345/174; 345/179
(58) Field of Search ................................ 345/173, 179; 382/119; 705/16, 17, 44

(56) References Cited

U.S. PATENT DOCUMENTS

| | | | | |
|---|---|---|---|---|
| 4,732,107 A | * | 3/1988 | Jacobsen ..................... 116/237 |
| 4,734,789 A | * | 3/1988 | Smith et al. ................. 358/300 |
| 5,181,742 A | * | 1/1993 | Peng ........................... 206/554 |
| 5,199,923 A | * | 4/1993 | Muller ......................... 281/21.1 |
| 5,223,677 A | * | 6/1993 | Kapp et al. ................. 178/18.03 |
| 5,451,724 A | * | 9/1995 | Nakazawa et al. ............. 178/20 |
| 5,561,446 A | * | 10/1996 | Montlick ....................... 345/173 |
| 5,604,517 A | * | 2/1997 | Filo ............................. 345/173 |
| 5,613,137 A | * | 3/1997 | Bertram et al. ................. 710/1 |
| 5,668,353 A | * | 9/1997 | Matsuda et al. ............... 178/18 |
| 5,724,064 A | * | 3/1998 | Stefik et al. ................. 345/105 |
| 5,831,599 A | * | 11/1998 | Inoue ........................... 345/173 |
| 5,832,113 A | * | 11/1998 | Sano ........................... 382/187 |
| 5,850,214 A | * | 12/1998 | McNally et al. ............. 345/173 |
| 5,861,874 A | * | 1/1999 | Joto ............................ 345/173 |
| 5,889,511 A | * | 3/1999 | Ong et al. ................... 345/173 |
| 5,892,824 A | * | 4/1999 | Beatson et al. ............. 713/186 |
| 6,061,051 A | * | 5/2000 | Chan et al. ................. 345/173 |
| 6,088,024 A | * | 7/2000 | Yamagata ..................... 345/173 |
| 6,104,386 A | * | 8/2000 | Yaotani ....................... 345/173 |
| 6,246,393 B1 | * | 6/2001 | Watanabe et al. ........... 345/173 |

FOREIGN PATENT DOCUMENTS

| | | |
|---|---|---|
| JP | 64-76215 | 3/1989 |
| JP | 9-325848 | 12/1997 |

* cited by examiner

*Primary Examiner*—Xiao Wu
*Assistant Examiner*—Kevin M. Nguyen
(74) *Attorney, Agent, or Firm*—Staas & Halsey LLP

(57) ABSTRACT

A coordinate input device includes a coordinate detecting part detecting a position of a touch on an operation surface so as to generate coordinate information of the position of a touch. The coordinate input device also includes a holding part holding a sheet-like material on the operation surface.

18 Claims, 32 Drawing Sheets

COORDINATE INPUT DEVICE AND A PROCESSOR READABLE MEDIUM

BACKGROUND OF THE INVENTION

1. Field of the Invention

The present invention generally relates to a coordinate input device and a processor readable medium, and particularly relates to a flat-type coordinate input device.

There are various types of coordinate detection methods for the flat-type coordinate input device. Known types of coordinate detection methods are an electromagnetic induction type, an electrostatic coupling type and a resistive film type. The resistive-film-type coordinate input device is advantageous since it provides a comparatively simple structure, reduced cost and reduced thickness.

The resistive-film-type coordinate input device is provided with two resistive films opposing each other with a small gap between the resistive films, and a certain voltage is applied across peripheral parts of each of the resistive films.

During a coordinate input operation, one of the resistive films is pressed so that the two resistive films come into contact. The voltage applied on the resistive film is divided at a contact point. Then, a position of the contact point is determined by detecting the divided voltage.

As has been described above, with the coordinate input device of the resistive film type, an input operation is achieved by simply touching one of the resistive films. Therefore, a stylus (hereinafter referred to as a pen) made of any material, or even a fingertip of the user, can be used as an input tool.

With the above-described advantages, the coordinate input device of the resistive film type has become a common flat-type coordinate input device.

Recently, there is a rapid growth of networks, the use of credit cards and the development of electronic money. This leads to an increasing need for an improved security for computer accesses. Such a security technology may include a personal authentication system using handwritten signatures, fingerprints and sound spectrograms.

Accordingly, there is a great interest in the flat-type coordinate input device of a resistive film type, which can be used in a personal authentication system using handwritten signatures. The flat-type coordinate input device using resistive films has an advantage that any type of pen can be used as an input tool, so that handwritten characters and figures can be recognized in a comparatively simple manner.

With the personal authentication system using handwritten signatures, it is verified whether a signature written by a pen on an operational surface matches with a signature registered in a storage location. It is desirable that the written characters and/or figures leave marks so that input characters and/or figures are visible while inputting information such as handwritten signatures.

2. Description of the Related Art

A flat-type coordinate input device of the related art is provided with an opaque cover sheet covering an operation surface of the coordinate input device. In order to input coordinate data, a fingertip or a tip of a pen touches and slides on the cover sheet. The pen may be made of a material such as plastic or metal.

With the coordinate input device of the related art, there is a disadvantage that it is not possible to check input characters and/or figures because no written mark remains on the cover sheet.

If a writing tool such as a ballpoint pen or a pencil is used for inscribing visible marks on the cover sheet, there is a disadvantage that the operational surface may be damaged or stained.

Also, if a signature is directly input to the coordinate input device, there is no inscribed signature marked on a slip. This may lead to a possibility that a further signature is to be made on a slip.

Also, if the coordinate input device is to be altered upon changing an application, there is a need for a plurality of coordinate input devices corresponding to various applications.

Accordingly, there is a need for a coordinate input device which can detect input information, such as characters and figures, on the operation surface while preserving inscribed marks of the input information and which is provided with a plurality of input functions.

SUMMARY OF THE INVENTION

Accordingly, it is a general object of the present invention to provide a coordinate input device which can satisfy the needs described above.

It is another and more specific object of the present invention to provide a coordinate input device having a coordinate detecting means which can hold a sheet-like material on the operational surface.

In order to achieve the above objects according to the present invention, a coordinate input device includes a coordinate detecting part detecting a position of a touch on an operation surface so as to generate coordinate information of the position; and a holding part holding a sheet-like material on the operation surface.

According to the present invention, a sheet-like material can be held by the holding part on the operation surface of the coordinate detecting means so that it is possible to input coordinates via an upper surface of the sheet-like material. Since the sheet-like material is held at a predetermined position with respect to the operation surface, an input can be made by means of a pen while preserving marks and carrying out a coordinate input operation according to the mark.

It is another object of the present invention to provide a coordinate input device which has improved usability and operability.

In order to achieve the above object, a coordinate input device includes:

a coordinate detecting part detecting a position of a touch on an operation surface and supplying coordination information of the position;

a processing circuit processing the coordination information;

a holding part holding a sheet-like material on the operation surface;

a detecting mechanism detecting a presence or a type of the sheet-like material placed on the operation surface; and a switching information generating part generating switching information used for switching processing functions in response to a result obtained from the detecting mechanism.

According to the present invention, processing functions can be switched in response to information related to the sheet-like material. Therefore, various input operations can be carried out and an improved operability is achieved.

Other objects and further features of the present invention will be apparent from the following detailed description when read in conjunction with the accompanying drawings.

DETAILED DESCRIPTION OF THE PREFERRED EMBODIMENTS

In the following, principles and embodiments of the present invention will be described with reference to the accompanying drawings.

Figure 1:
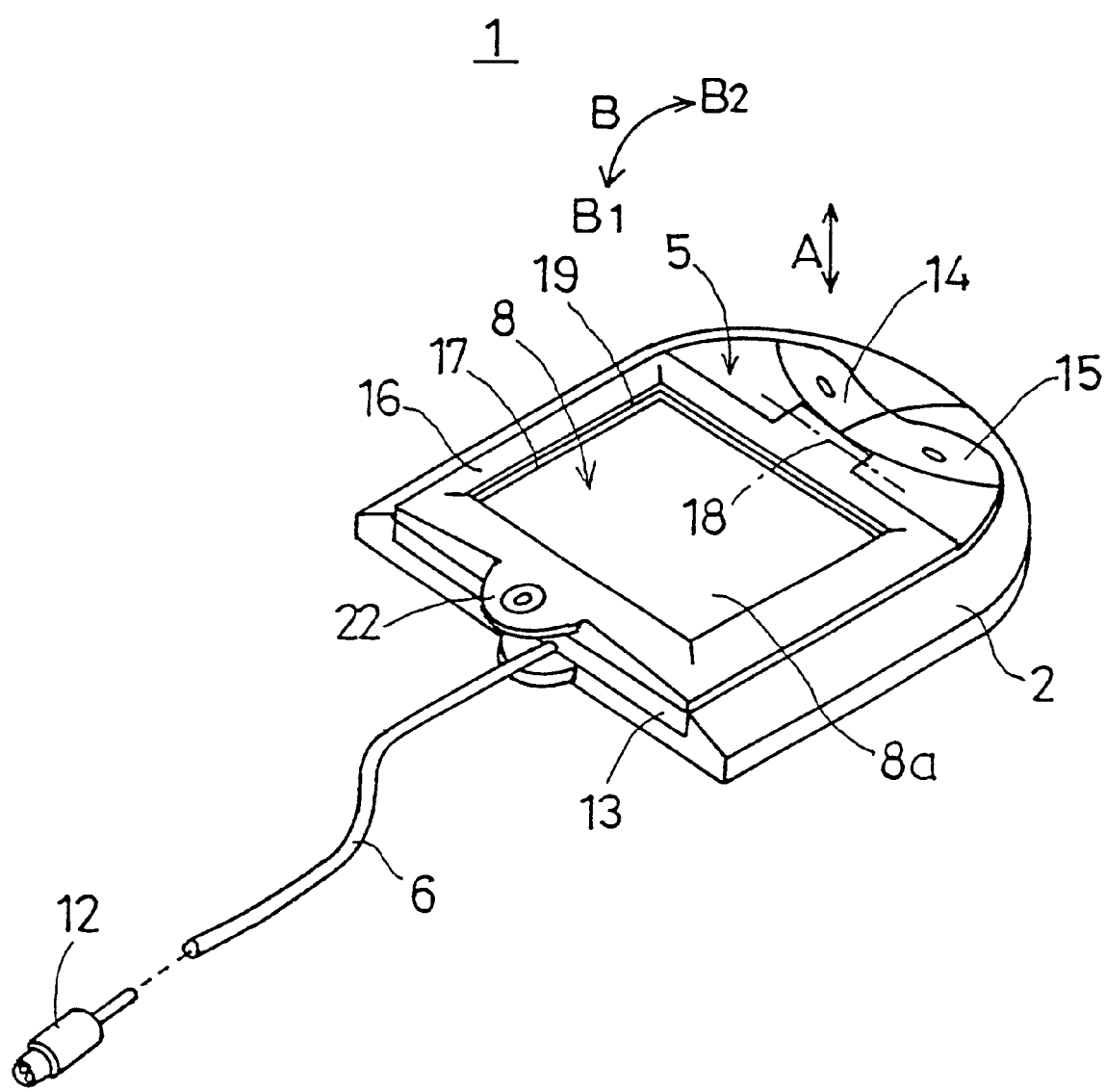
FIG. 1 is a perspective diagram showing a coordinate input device of a first embodiment of the present invention.
Figure 2:
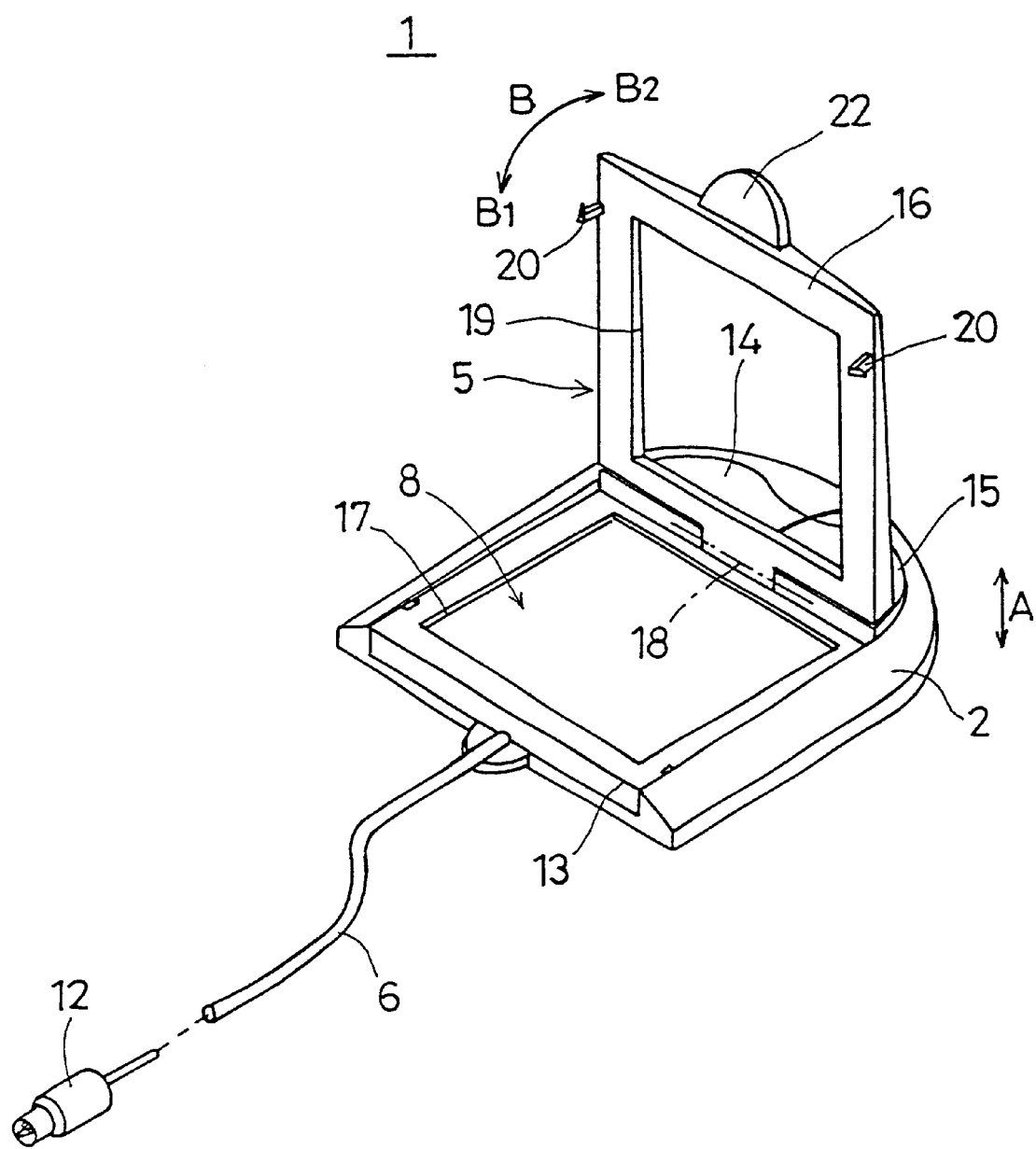
FIG. 2 is a perspective diagram showing the coordinate input device of the first embodiment of the present invention, with a flap being shown in an open position.
Figure 3:
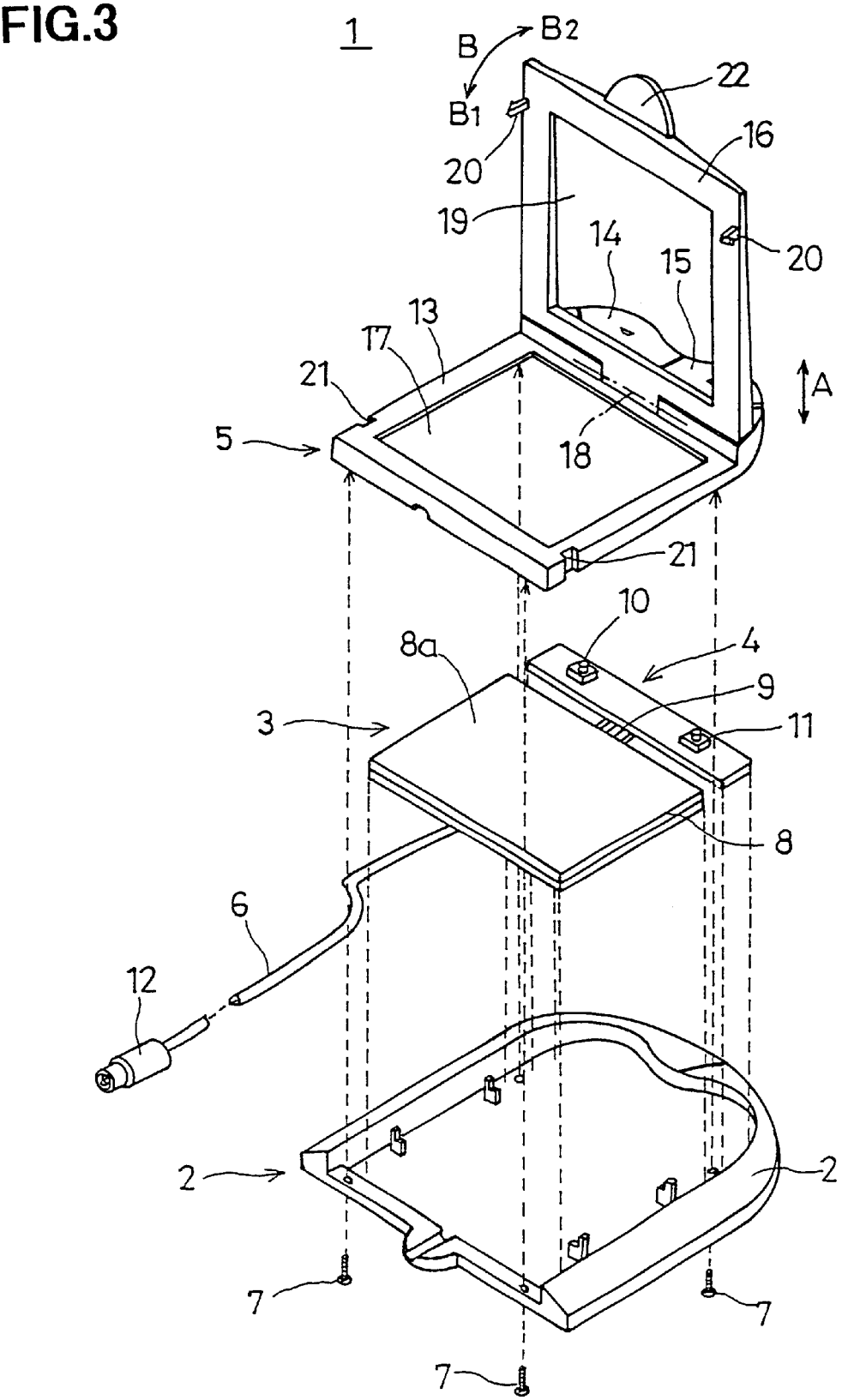
FIG. 3 is an exploded perspective diagram showing the coordinate input device of the first embodiment of the present invention.

FIGS. 1 and 2 are perspective diagrams showing a coordinate input device of a first embodiment of the present invention. FIG. 3 is an exploded perspective diagram showing the coordinate input device of the first embodiment of the present invention.

A coordinate input device 1 of the present invention can be connected to a computer. As shown in FIG. 3, the coordinate input device 1 of the present embodiment is provided with a housing 2, circuit boards 3, 4, a cover 5, an external connection cable 6 and screws 7.

The housing 2 cooperates with the cover 5 so as to accommodate the circuit boards 3, 4. The circuit board 3 has one surface provided with a coordinate input part 8 mounted thereon and another surface provided with a signal processing circuit mounted thereon. The coordinate input part 8 is a coordinate detecting part of a resistive film type. Coordinate input signals detected at the coordinate input part 8 are supplied to the signal processing circuit mounted on the other surface. The signal processing circuit converts the signals detected at the coordinate input part 8 into coordinate information.

The circuit board 3 is connected to the circuit board 4 via a connection cable 9. The circuit board 4 is provided with a right switch 10 and a left switch 11. Signals related to operations of the right and left switches 10, 11 are supplied to the signal processing circuit on the circuit board 3 via the connection cable 9. The signal processing circuit generates button operation information in response to operations of the right and left switches 10, 11.

The circuit board 3 is connected to one end of the external connection cable 6. The other end of the external connection cable 6 is, for example, formed as a PS/2 port connector 12, which can be connected to the PS/2 port of the computer. The coordinate information and operation information generated at the circuit boards 3, 4 are supplied to the computer via the external connection cable 6. The computer performs various processes in response to the coordinate information and the operation information supplied from the coordinate input device 1.

The cover 5 includes a cover main body 13, a right operation button 14, a left operation button 15, and a flap part 16. The cover 5 extends over the housing 2 so as to cover a part of the housing 2 accommodating the circuit boards 3, 4. The cover main body 13 is assembled to the housing 2 by means of the screws 7 penetrating through the housing 2. Thus, by assembling the housing 2 to the cover body 13, the circuit boards 3, 4 are securely held in the housing 2.

The cover main body 13 is provided with an opening 17. When the cover main body 13 is assembled to the housing 2, an operational surface 8a of the coordinate input part 8 mounted on the circuit board 3 is exposed through the opening 17. Also, the coordinate input device 1 is configured such that a gap of height d0 is provided between the surface of the cover main body 13 and the operation surface 8a of the coordinate input part 8 (see FIG. 9A).

Also, the right operation button 14 and the left operation button 15 are held in the cover main body 13 and are movable through a comparatively small distance in a direction shown by an arrow A. When the cover main body 13 is assembled to the housing 2, the right and left operation buttons 14, 15, respectively, are positioned above corresponding right and left switches 10, 11 mounted on the circuit board 4.

Thus, the right switch 10 is activated by manipulating the right operation button 14 in the direction A, and the left switch 11 is activated by manipulating the left operation button 15 in the direction A.

The flap part 16 is assembled to the cover main body 13 so as to be pivotable about an axis 18 in directions B1 and B2 shown by an arrow B. Also, the flap part 16 is provided with an opening 19. When the flap part 16 is pivoted in a B1-direction to a closed position as shown in FIG. 1, the opening 19 coincides with the opening 17 of the cover main body 13. Thus, as shown in FIG. 1, even if the flap part 16 is in the closed position, the operation surface 8a of the coordinate input part 8 is exposed through the openings 17, 19.

The flap part 16 is provided with hooks 20 positioned at an end region distal from the pivotal axis 18 on a side opposing the cover main body 13. The cover main body 13 is provided with engagement parts 21 at positions corresponding to the hooks 20 of the flap part 16. When the flap part 16 is pivoted in the B1-direction, the hooks 20 engage the engagement parts 21. Thus, the flap part 16 is held on the cover main body 13 in the closed position.

Further, in order to facilitate disengagement of the hooks 20 and the engagement parts 21, the flap part 16 is provided with a tab 22 positioned at an edge distal from the pivotal axis 18. The user lifts the tab 22 with his finger to pivot the flap part 16 in a B2-direction, so as to bring the flap part 16 into the open position.

Figure 4:
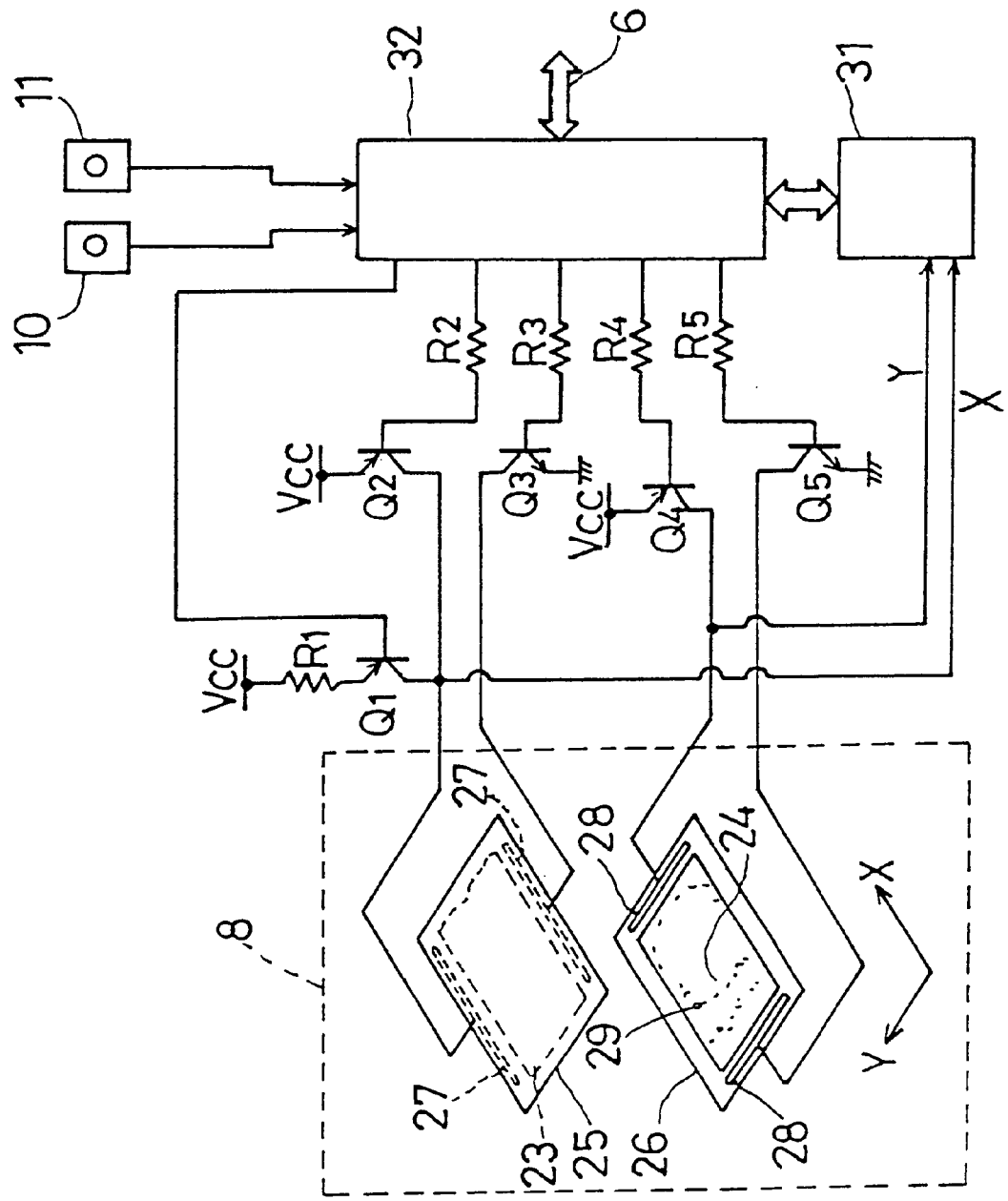
FIG. 4 is a schematic diagram showing a circuit board used in the coordinate input device of the first embodiment of the present invention.

In the following, a structure of a circuit formed on the circuit board 4 will be described in detail. FIG. 4 is a schematic diagram showing a circuit board used in the coordinate input device of the first embodiment of the present invention.

As shown in FIG. 4, the coordinate input part 8 mounted on the circuit board 4 is configured such that PET films 25, 26 provided with carbon resistive films 23, 24, respectively, are positioned in such a manner that the carbon resistive films 23, 24 oppose each other. The PET film 25 is provided with electrodes 27 formed in a direction parallel to the X-direction. The PET film 26 is provided with electrodes 28 formed in a direction parallel to the Y-direction.

There are dot spacers 29 placed between the PET films 25 and 26. Therefore, in the normal state, the PET films 25 and 26 are not in contact with each other.

Figure 5A:
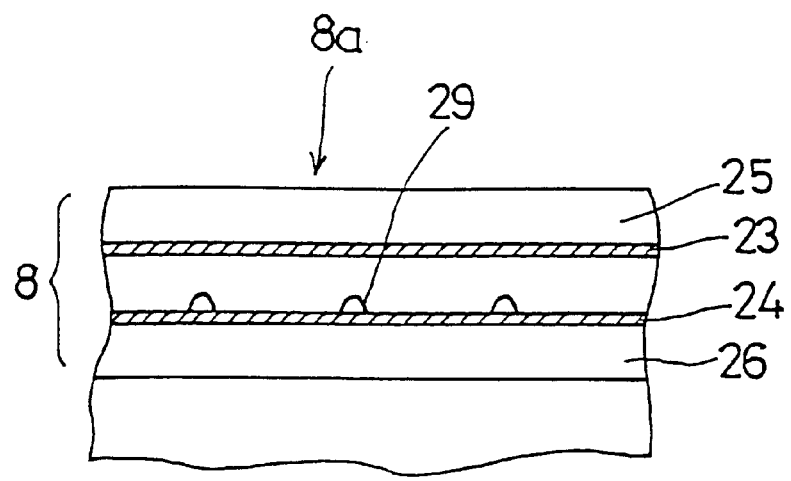
FIGS. 5A and 5B are cross-sectional diagrams showing a coordinate input part of the coordinate input device of the first embodiment of the present invention.
Figure 5B:
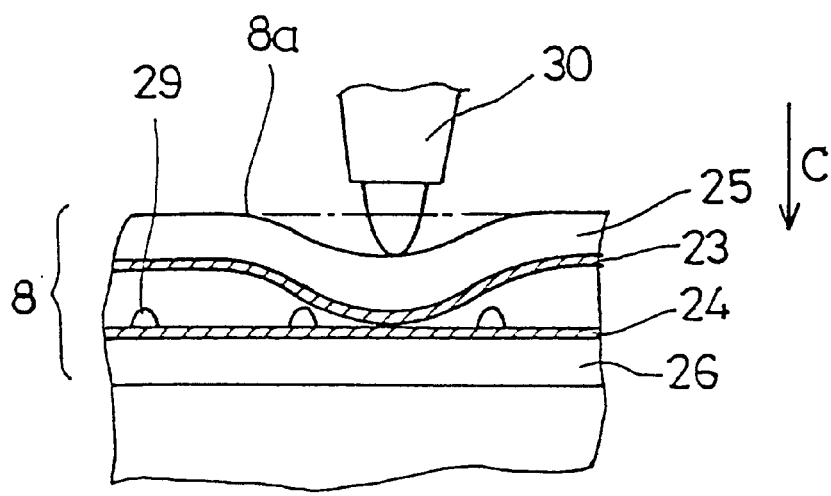

In the following, the coordinate input part 8 will be described in detail. FIGS. 5A and 5B are cross-sectional diagrams showing a coordinate input part of the coordinate input device of the first embodiment of the present invention. FIG. 5A is a diagram showing a normal state and FIG. 5B is a diagram showing a state during a coordinate input operation. Note that like reference numerals are used for indicating like components in FIGS. 5A and 5B and FIG. 4.

As shown in FIG. 5A, in the normal state, the PET films 25 and 26 are substantially parallel to each other, so that the carbon resistive films 23, 24 are not in contact with each other.

Also, as shown in FIG. 5B, when the operation surface 8a is pressed in a direction shown by an arrow C, the PET film 25 bends in the C-direction, so that the carbon resistive films 23, 24 come into contact with each other. Then, at the contact point of the carbon resistive films 23, 24, the voltage division ratio between the electrodes 27, 28 changes. Thus, by measuring the voltage division ratio between the electrodes 27, 28, a position of a pen 30 can be detected as coordinates on the operation surface 8a. During the detection of the coordinates, the carbon resistive films 23 and 24 are held with a certain gap between each other by means of the dot spacers 29.

Referring again to FIG. 4, the coordinate input device of the present embodiment is provided with a sensing circuit for sensing whether or not there is a contact on the operation surface. The sensing circuit includes a resistor R1 and a transistor Q1. The coordinate input device of the present invention is arranged such that a voltage is applied between the resistive films 23, 24 via the transistors Q1, Q5 and one each of the electrodes 27, 28.

In order to sense whether there is a contact on the operation surface, a control part 32 switches on the transistors Q1, Q5, and switches off the transistors Q2–Q4, and applies a voltage between the resistive films 23, 24. Then, the voltage output via the electrodes 28 corresponds to a divided voltage of the driving voltage Vcc divided according to the resistor R1 and the contact resistance between the resistive films 23, 24. By means of the detecting part 32, if this divided voltage exceeds a predetermined threshold value, it is determined that there is no contact, and if this divided voltage does not exceed the predetermined threshold value, it is determined that there is a contact.

In the following, a method of detecting the coordinate values will be described, assuming that a contact has been sensed by the sensing circuit.

First, the control part 32 switches off the transistors Q1–Q3 and switches on the transistors Q4, Q5, so that a voltage is applied between the electrodes 28. The voltage applied between the electrodes 28 is divided at the contact position on the resistive films, and is output from the electrodes 27 as a voltage representing the X-coordinate. A detecting part 31 implements an A/D conversion on the voltage output from one of the electrodes 27 and supplies the converted voltage to the control part 32 as information corresponding to the X-coordinate. The control part 32 then generates X-coordinate information according to the information supplied by the detecting part 31.

Secondly, the control part 32 switches off the transistors Q1, Q4, S5 and switches on the transistors Q2, Q3, so that a voltage is applied between the electrodes 27. The voltage applied between the electrodes 27 is divided at the contact position on the resistive films, and is output from the electrodes 28 as a voltage representing the Y-coordinate. The detecting part 31 implements an A/D conversion on the voltage output from one of the electrodes 28 and supplies the converted voltage to the control part 32 as information corresponding to the Y-coordinate. The control part 32 then generates Y-coordinate information according to the information supplied by the detecting part 31.

Also, the control part 32 is connected to the right and left switches 10 and 11 mounted on the circuit board 4, detects ON/OFF states of the right and left switches 10 and 11 and generates operation information. The coordinate information and the operation information generated at the control part 32 are delivered to the computer via the external connection cable 6.

In the following, an example of a usage of the coordinate input device 1 in a normal mode will be described.

Figure 6:
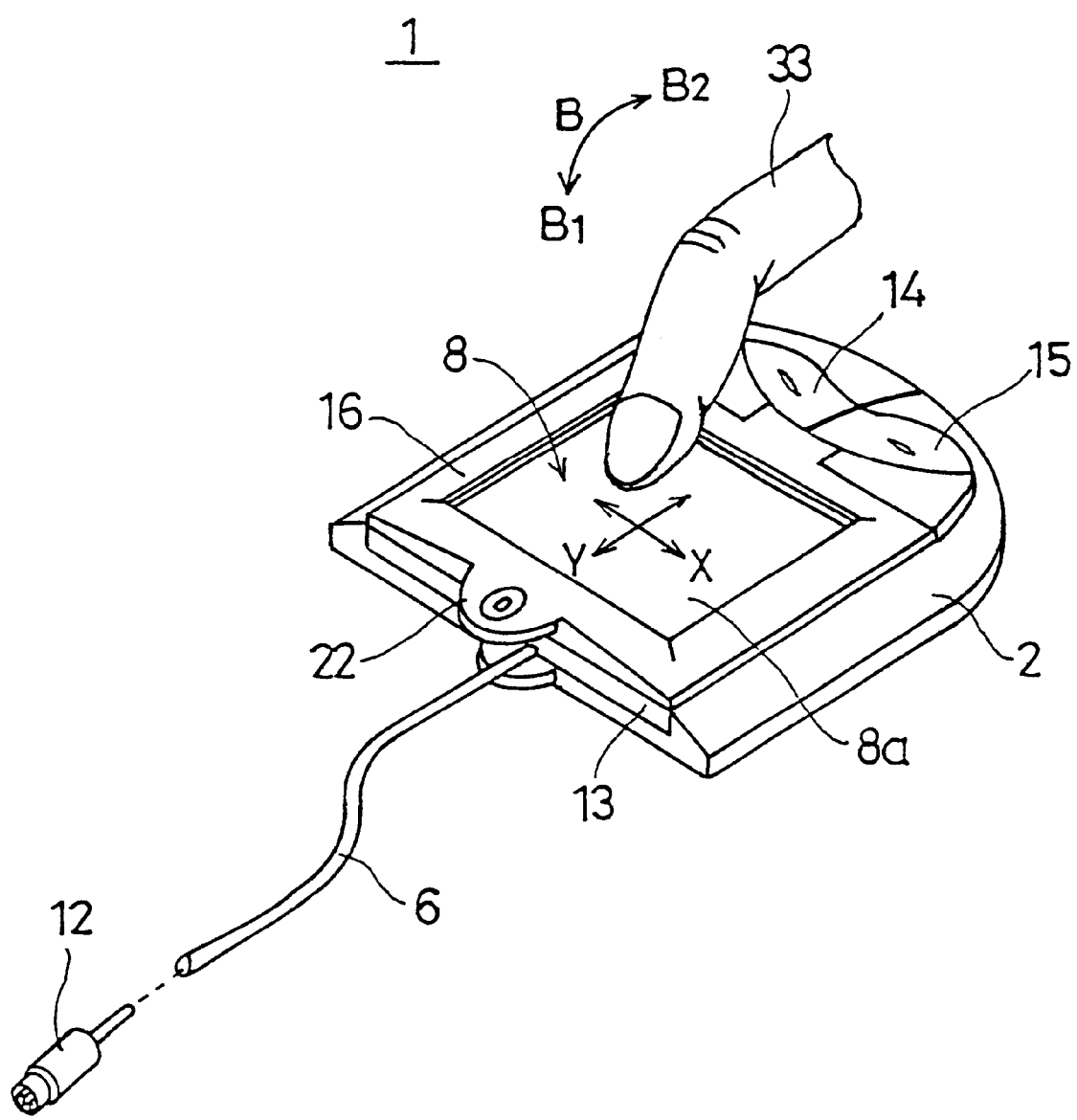
FIG. 6 is a perspective diagram showing how the coordinate input device of the first embodiment of the present invention is used in a normal mode.

FIG. 6 is a perspective diagram showing how the coordinate input device of the first embodiment of the present invention is used in a normal mode.

As shown in FIG. 6, when simply used as a normal pointing device, the flap part 16 is closed in the B1-direction. The user touches the operation surface 8a with his finger 33 and slides the finger 33 in the X- and Y-directions. Thus, the coordinate input and, if required, the right operation button 14 or the left operation button 15 is operated.

Thus, the coordinate input device 1 can be operated as a normal flat-type pointing device.

In the following, a handwriting input mode, using a pen, of the coordinate input device 1 will be described.

FIGS. 7 to 9B are diagrams showing an operation of the coordinate input device of the first embodiment of the present invention in a handwriting input mode.

Figure 7:
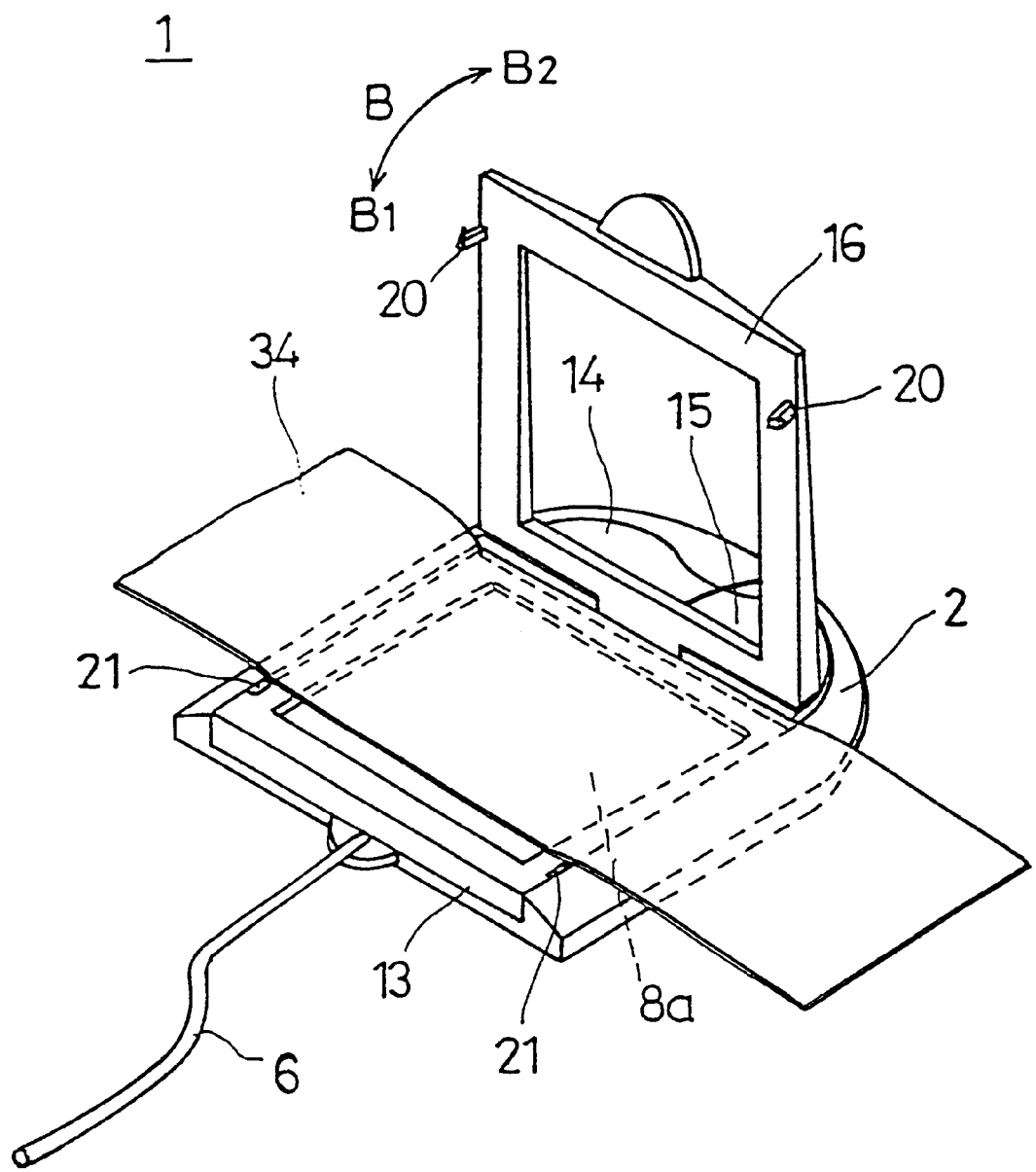
FIG. 7 is a perspective diagram showing how a sheet-like material is placed on the coordinate input device of the first embodiment of the present invention in a handwriting input mode.

When in the handwriting input mode, first, as shown in FIG. 7, the flap part 16 is opened in the. B2-direction, and a piece of sheet-like material, here, inscribable sheet material 34, such as a piece of paper or a slip, is placed on the operation surface 8a. Then, the flap part 16 is pivoted in the B1-direction, so as to hold the inscribable sheet material 34 between the flap part 16 and the operation surface 8a. At the end of the pivotal movement in the B1-direction, the hooks 20 engage the engagement parts 21.

Figure 8:
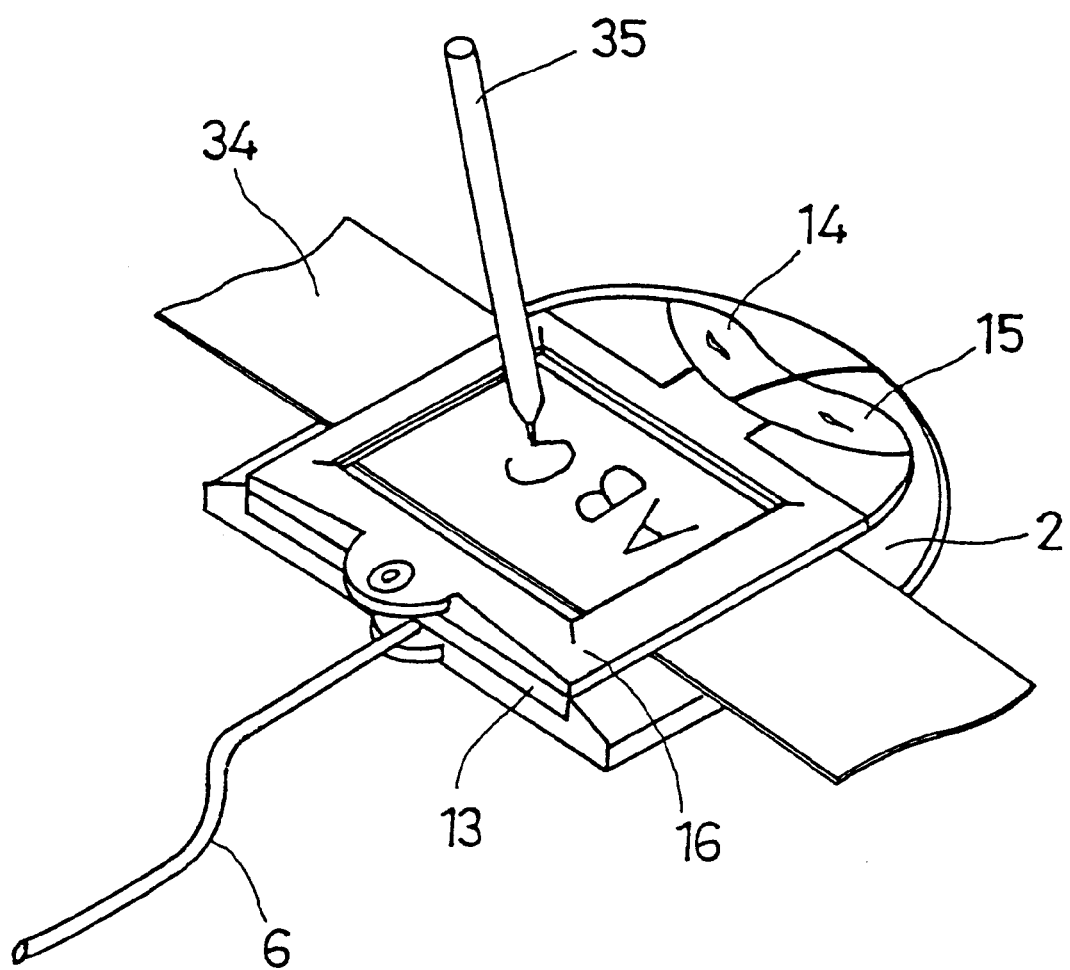
FIG. 8 is a perspective diagram showing how the coordinate input device of the first embodiment of the present invention is used in the handwriting input mode.
Figure 9A:
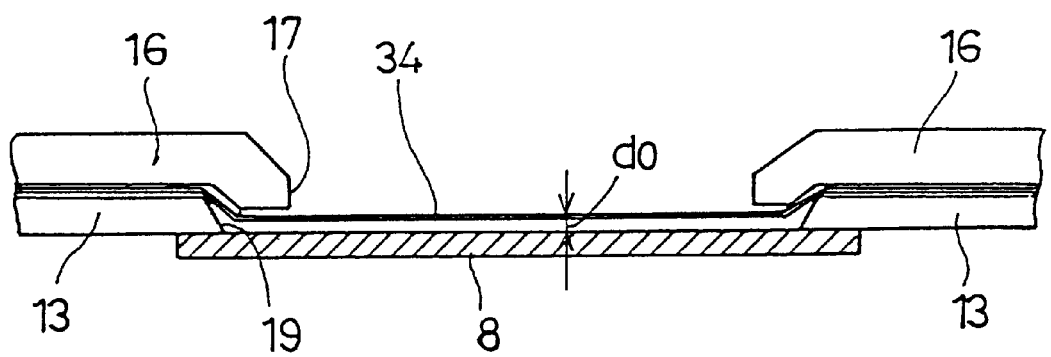
FIGS. 9A and 9B are cross-sectional diagrams showing the coordinate input part of the coordinate input device of the first embodiment of the present invention in the handwriting input mode.
Figure 9B:
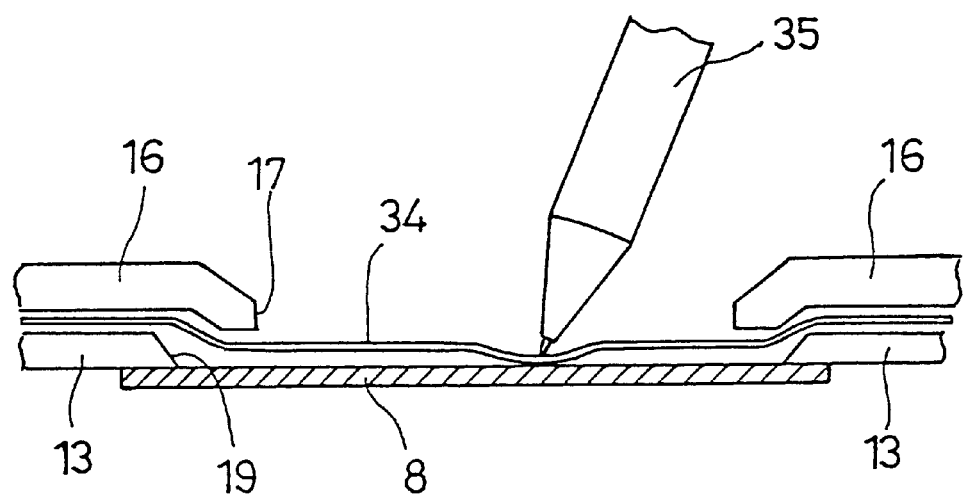

Thus, as shown in FIGS. 8 and 9A, the inscribable sheet material 34 is straightened on the operation surface 8a and characters or figures may be easily written on the inscribable sheet material 34. Also, the inscribable sheet material 34 is held such that there is a gap d0 between the operation surface 8a and the inscribable sheet material 34. Therefore, the inscribable sheet material 34 is prevented from touching the operation surface 8a when no input operation is being implemented.

When characters or figures are written on the inscribable sheet material 34 by means of a pen 35, these are inscribed on the inscribable sheet material 34 as shown in FIG. 8, and the operation surface 8a is traced by the pen 35, so that coordinates of the characters or figures are sequentially input by the coordinate input part 8.

Now, as an example, the inscribable sheet material 34 or a slip is held between the flap part 16 and the operation surface 8a. The inscribable sheet material 34 is positioned such that a predetermined blank part thereof reserved for a signature is aligned with the openings 17, 19. Thus, when a signature is written on the blank part, the signature is marked on the inscribable sheet material 34 while signature data is supplied to the computer in the form of coordinate data.

The computer to which the coordinate input device 1 is connected may be provided with an IC-card reader. Also, an IC-card is prepared in which signature information for authentication is prestored. Then, an authorized owner of the IC-card can be authenticated by comparing a signature input by the coordinate input device 1 with the signature stored in the IC-card.

Thus, the coordinate input device 1 can be used as a normal flat-type pointing device in the normal mode and also as an input and authentication device in a handwriting input mode. During the handwriting input mode, the signature is made on the inscribable sheet material 34 held between the flap part 16 and the operation part 8a, so that the signature is visible during an input operation.

The coordinate input device 1 of the present embodiment is a so-called resistive film type. Therefore, a coordinate input operation is still possible with a plurality of inscribable sheet materials 34 being placed on the coordinate input device 1, as long as the resistive films are capable of being in contact with each other.

In the present embodiment, a coordinate detection operation is implemented with the same sensitivity for both the normal mode and the handwriting input mode. However, it is also possible to detect an existence of the inscribable sheet material so that the coordinate detection mode can be switched between the normal mode and the handwriting mode according to the existence of the inscribable sheet material.

Figure 10:
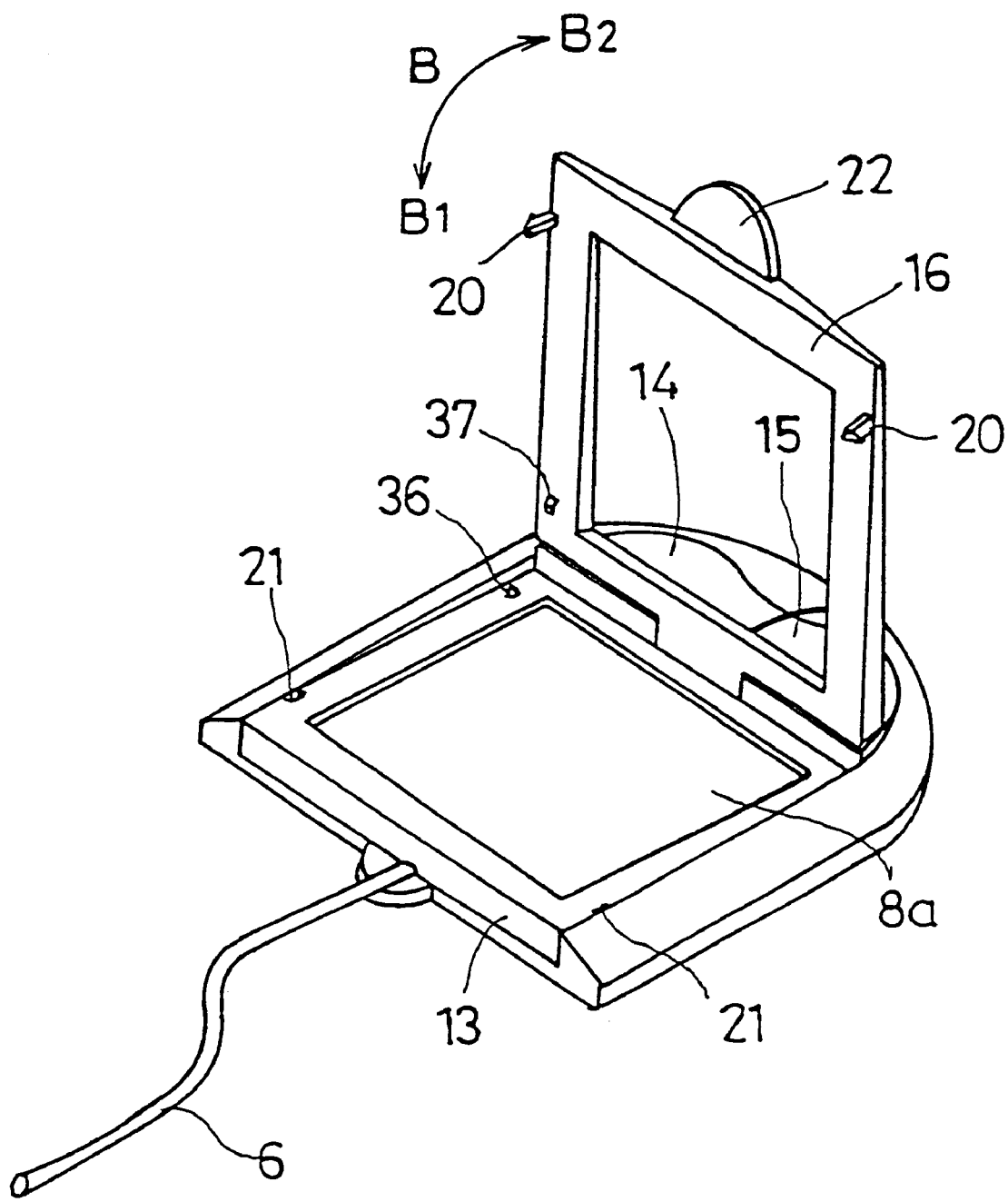
FIG. 10 is a perspective diagram showing a coordinate input device of a second embodiment of the present invention, with a flap being shown in an open position.

FIG. 10 is a perspective diagram showing a coordinate input device of a second embodiment of the present invention, with a flap being shown in an open position. In FIG. 10, components similar to those shown in FIGS. 1 to 3 are shown by similar reference numerals and further description is omitted.

In the present embodiment, the cover main body 13 is provided with a microswitch 36 on a surface opposing the flap part 16, while the flap part 16 is provided with a recessed part 37 at a position opposing the microswitch 36. When the inscribable sheet material 34 does not exist between the flap part 16 and the operation part 8a and the flap part 16 is in the closed position, the microswitch 36 is switched off. When the inscribable sheet material 34 exists between the flap part 16 and the operation part 8a and the flap part 16 is in the closed position, the microswitch 36 is switched on.

Figure 11A:
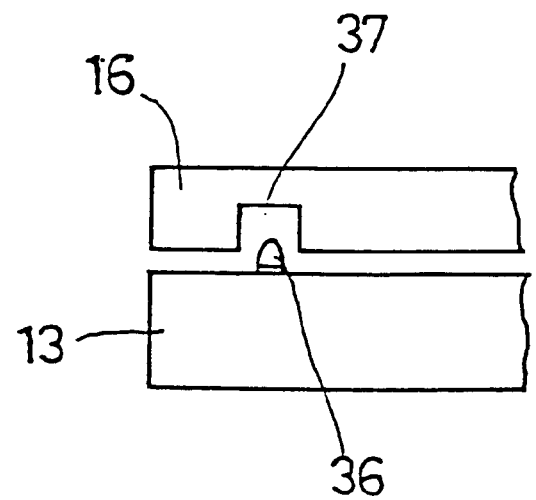
FIGS. 11A and 11B are cross-sectional diagrams showing a microswitch provided in the coordinate input device of the second embodiment of the present invention.
Figure 11B:
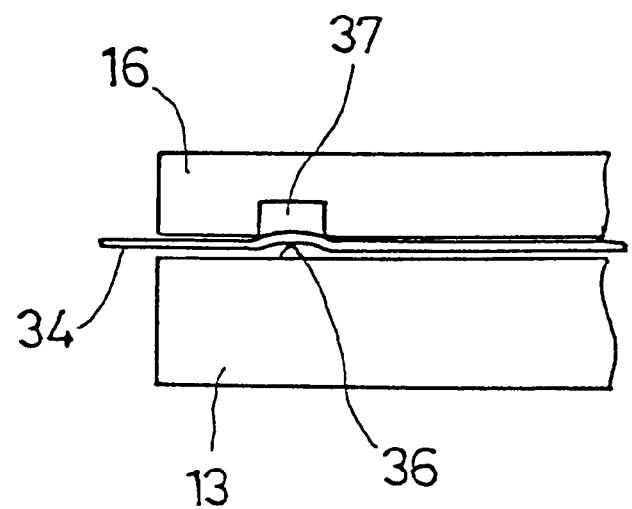

FIGS. 11A and 11B are cross-sectional diagrams showing the microswitch provided in the coordinate input device of the second embodiment of the present invention. FIG. 11A is a diagram showing a state where the inscribable sheet material 34 does not exist between the flap part 16 and the operation part 8a. FIG. 11B is a diagram showing a state where the inscribable sheet material 34 exists between the flap part 16 and the operation part 8a.

As shown in FIG. 11A, when the flap part 16 is closed when the inscribable sheet material 34 does not exist between the flap part 16 and the operation part 8a, the contact of the microswitch 36 is not pressed because the contact is placed within the recessed part 37. Therefore, the microswitch 36 is in an OFF state.

Also, as shown in FIG. 11B, when the flap part 16 is closed when the inscribable sheet material 34 exists between the flap part 16 and the operation part 8a, the contact of the microswitch 36 is pressed by the inscribable sheet material 34 obstructing the recessed part 37. Thus, the microswitch 36 is in an ON state. The data related to the ON/OFF state of the microswitch is supplied to the circuit board 3.

Figure 12:
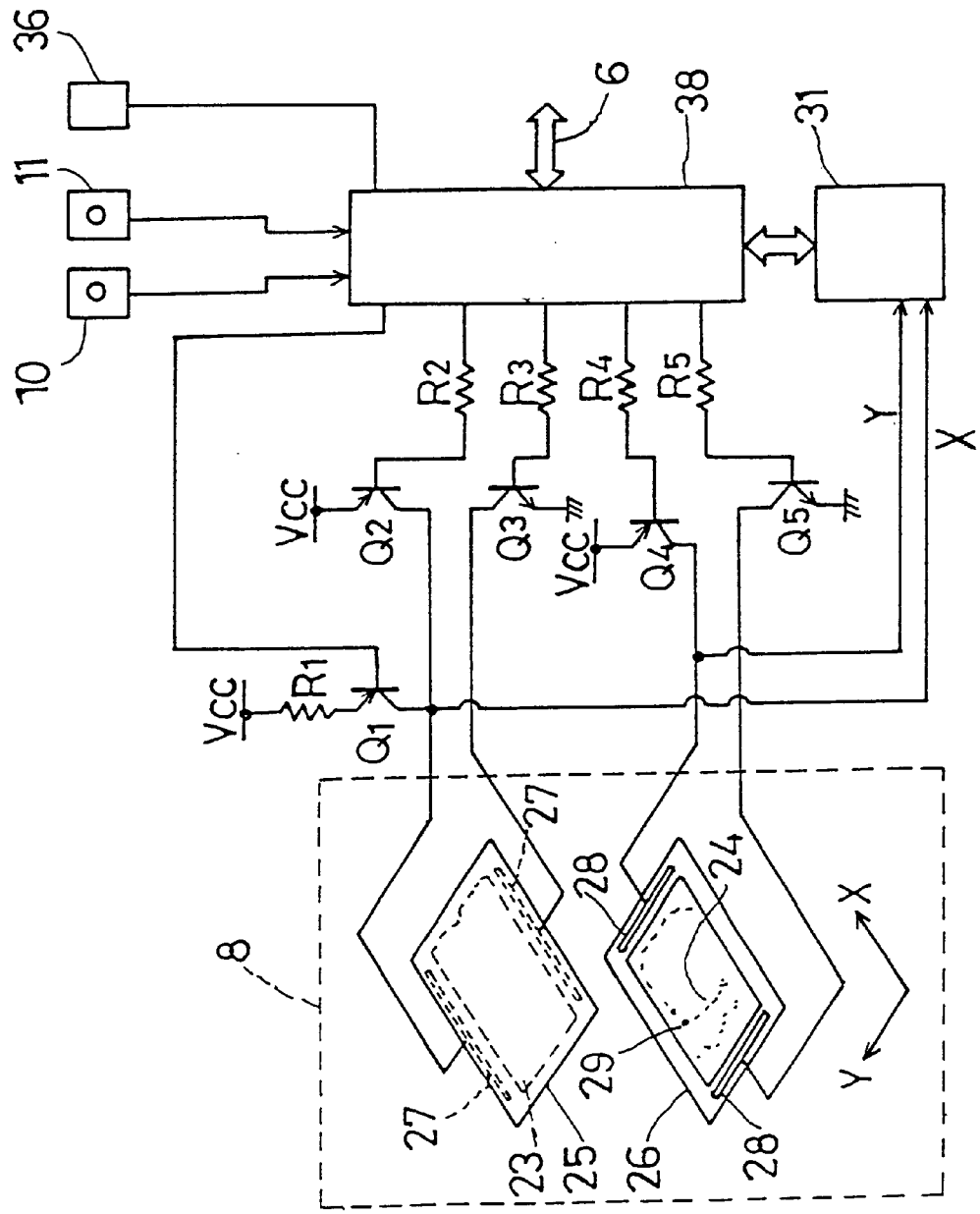
FIG. 12 a schematic diagram showing a circuit board used in the coordinate input device of the second embodiment of the present invention.

FIG. 12 a schematic diagram showing a circuit board used in the coordinate input device of the second embodiment of the present invention. In FIG. 12, components similar to those shown in FIG. 4 are shown by similar reference numerals and further description is omitted.

The microswitch 36 is connected to a control part 38. The control part 38 switches the detection mode in response to the ON/OFF state of the microswitch 36. For example, if the microswitch 36 is in the OFF state, that is to say, the inscribable sheet material 34 does not exist on the operation surface 8a, the detection mode is switched to a relative value mode. In the relative value mode, the points on the coordinate are indicated as relative positions, and the coordinate input device 1 is used as a normal pointing device such as a mouse.

On the contrary, if the microswitch 36 is in the ON state, that is to say, the inscribable sheet material 34 exists on the operation surface 8a, the detection mode is switched to an absolute value mode. In the absolute value mode, points on the coordinate are indicated as absolute positions, and it is possible to input information such as characters and figures.

In the present embodiment, the microswitch 36 is used for detecting the presence of the inscribable sheet material 34. However, such detection is not limited to a use of the microswitch 36, but another element capable of detecting the presence of the inscribable sheet material 34 on the operation surface 8a, such as a photocoupler, can be used.

Figure 13:
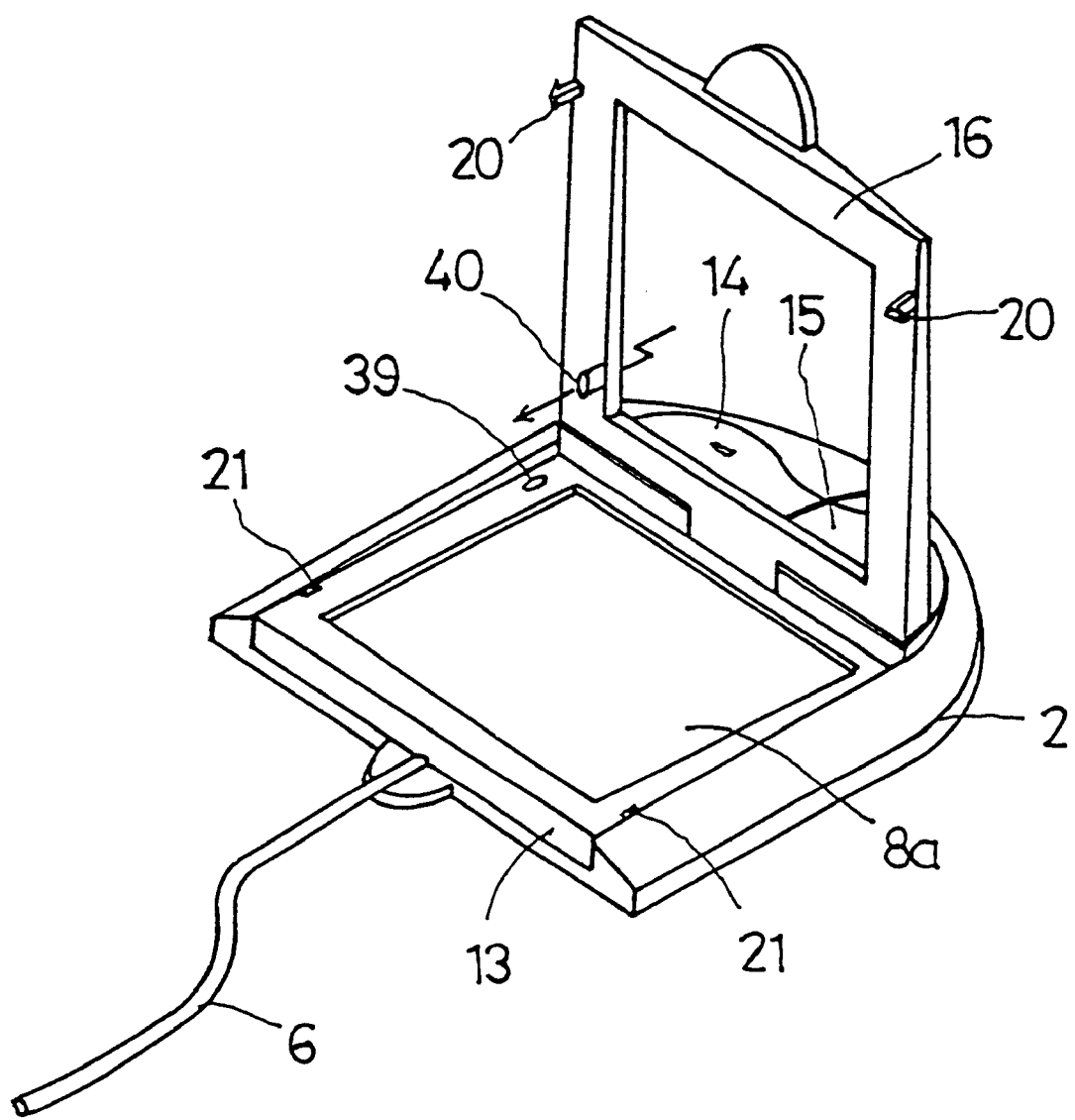
FIG. 13 is a perspective diagram showing a coordinate input device of a variant of the second embodiment of the present invention, with a flap being shown in an open position.

FIG. 13 is a perspective diagram showing a coordinate input device of a variant of the second embodiment of the present invention, with a flap being shown in an open position. In FIG. 13, components similar to those shown in FIG. 10 are shown by similar reference numerals and further description is omitted.

In this variant, instead of the microswitch 36, a photocoupler 39 is provided on the plane of the operation surface 8a. The flap part 16 is provided with a through-hole 40 at a position opposing the photocoupler 39.

Figure 14A:
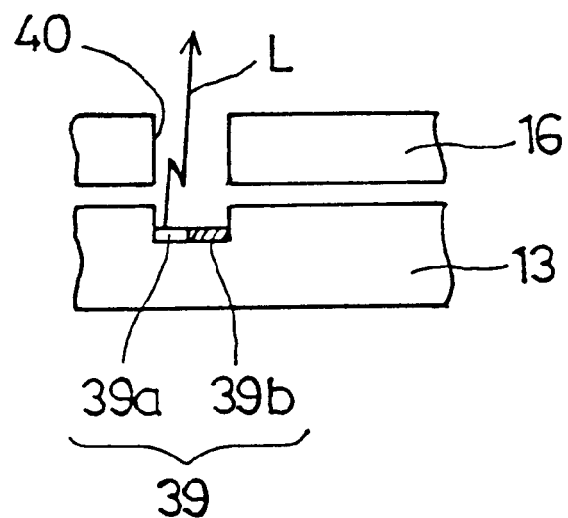
FIGS. 14A and 14B are cross-sectional diagrams showing a photocoupler provided in the coordinate input device of the variant of the second embodiment of the present invention.
Figure 14B:
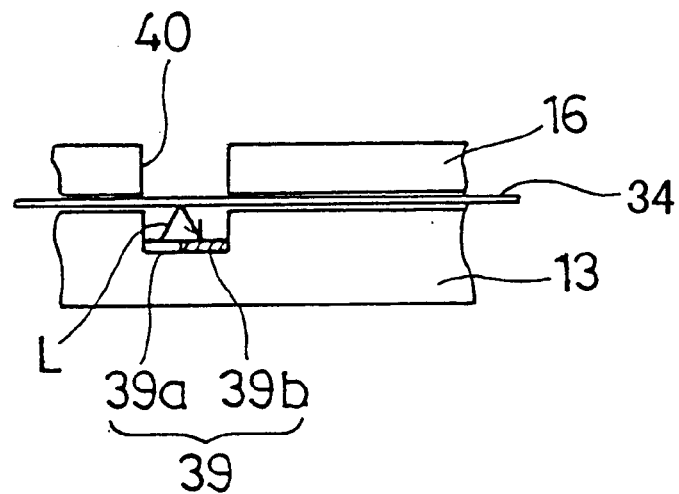

FIGS. 14A and 14B are cross-sectional diagrams showing the photocoupler provided in the coordinate input device of the variant of the second embodiment of the present invention. FIG. 14A is a diagram showing a state where the inscribable sheet material 34 does not exist between the flap part 16 and the operation part 8a. FIG. 14B is a diagram showing a state where the inscribable sheet material 34 exists between the flap part 16 and the operation part 8a.

The photocoupler 39 includes a light-emitting element 39a and a light-receiving element 39b. The light-emitting element 39a emits light. The light-receiving element 39b receives light emitted from the light-emitting element 39a. The light-receiving element 39b is switched on and off according to the reception of the light. The through-hole 40 in the flap part 16 is positioned so as to oppose the photocoupler 39.

As shown in FIG. 14A, when the inscribable sheet material 34 does not exist between the flap part 16 and the operation part 8a, the light L emitted from the light-emitting element 39a will be radiated outside through the through-hole 40. In other words, the light-receiving element 39b does not receive light emitted from the light-emitting element 39a. Thus, the light-receiving element 39b is in an OFF state.

As shown in FIG. 14B, when the inscribable sheet material 34 exists between the flap part 16 and the operation part 8a, the light L emitted from the light-emitting element 39a will irradiate the inscribable sheet material 34, will be reflected at the inscribable sheet material 34, and will be incident on the light-receiving element 39b. Thus, the light-receiving element 39b receives a reflected light and will be in an ON state.

The photocoupler 39 is connected to the control part 38 and switches the detection mode between the relative value mode and the absolute value mode according to the ON/OFF state of the light-receiving element 39b.

For example, if the light-receiving element 39b is in the OFF state, that is to say, the inscribable sheet material 34 does not exist on the operation surface 8a, the detection mode is switched to the relative value mode. In the relative value mode, the points on the coordinate are indicated as relative positions, and the coordinate input device 1 is used as a normal pointing device such as a mouse.

On the contrary, if the light-receiving element 39b is in the ON state, that is to say, the inscribable sheet material 34 exists on the operation surface 8a, the detection mode is switched to the absolute value mode. In the absolute value mode, the points on the coordinate are indicated as absolute positions, and it is possible to input information such as characters and figures.

In the first and second embodiments, the coordinate information and the operation information are sent to the computer via the external connection cable 6. However, it is also possible to send the coordinate information and the operation information by means of an infrared communication for a wireless adaptation.

Figure 15:
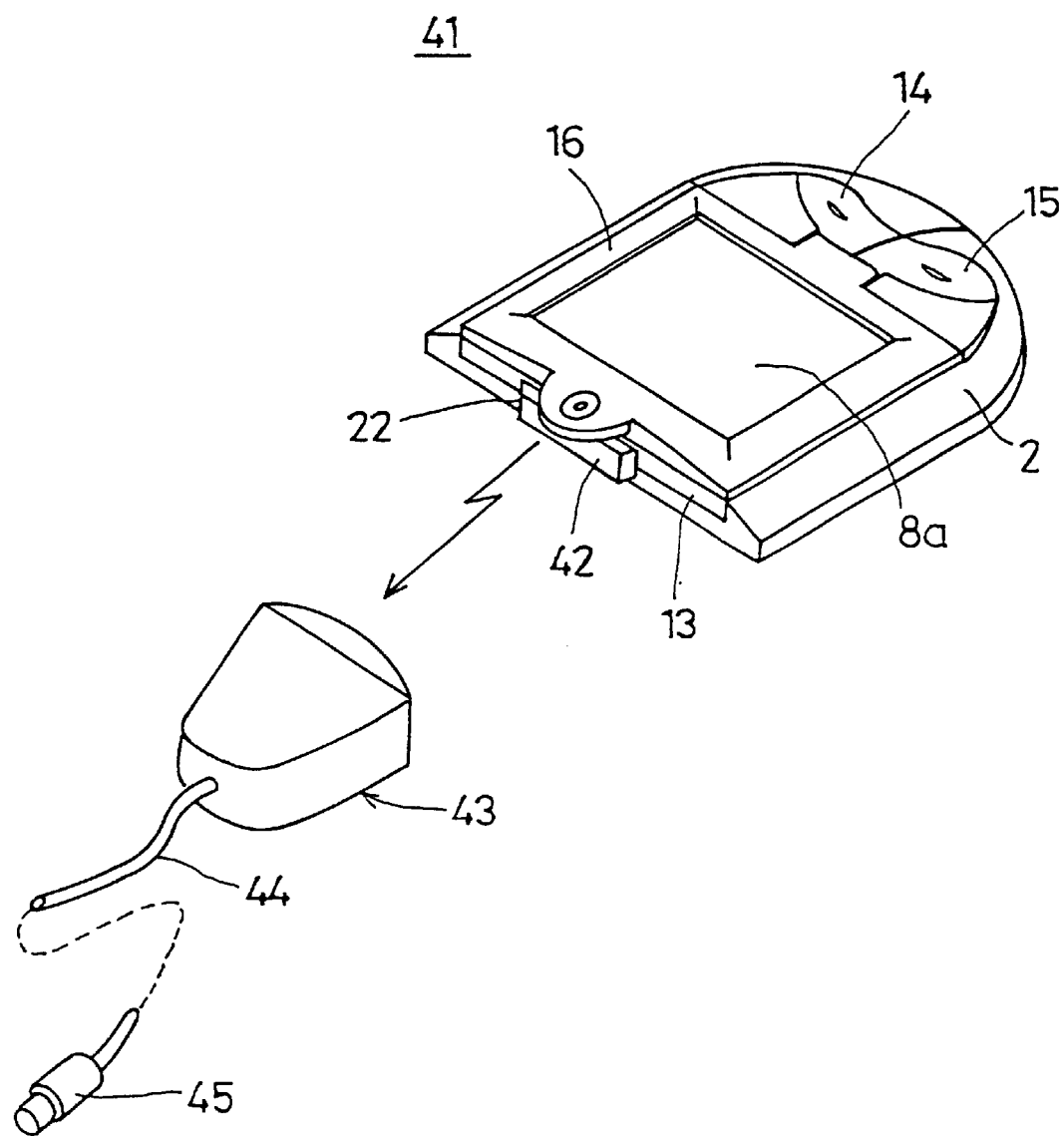
FIG. 15 is a perspective diagram showing a coordinate input device of a third embodiment of the present invention.
Figure 16:
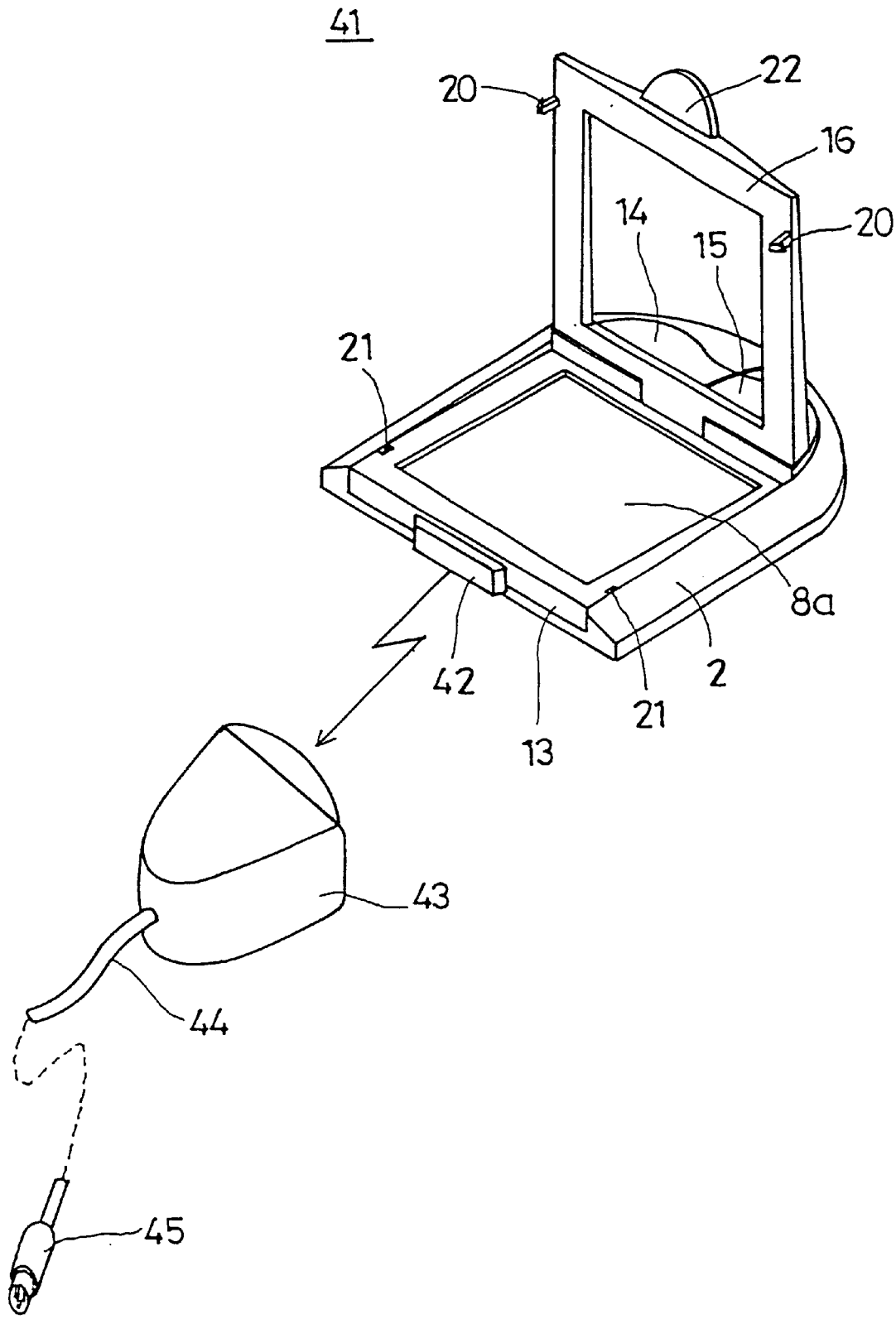
FIG. 16 is a perspective diagram showing the coordinate input device of the third embodiment of the present invention, with a flap being shown in an open position.
Figure 17:
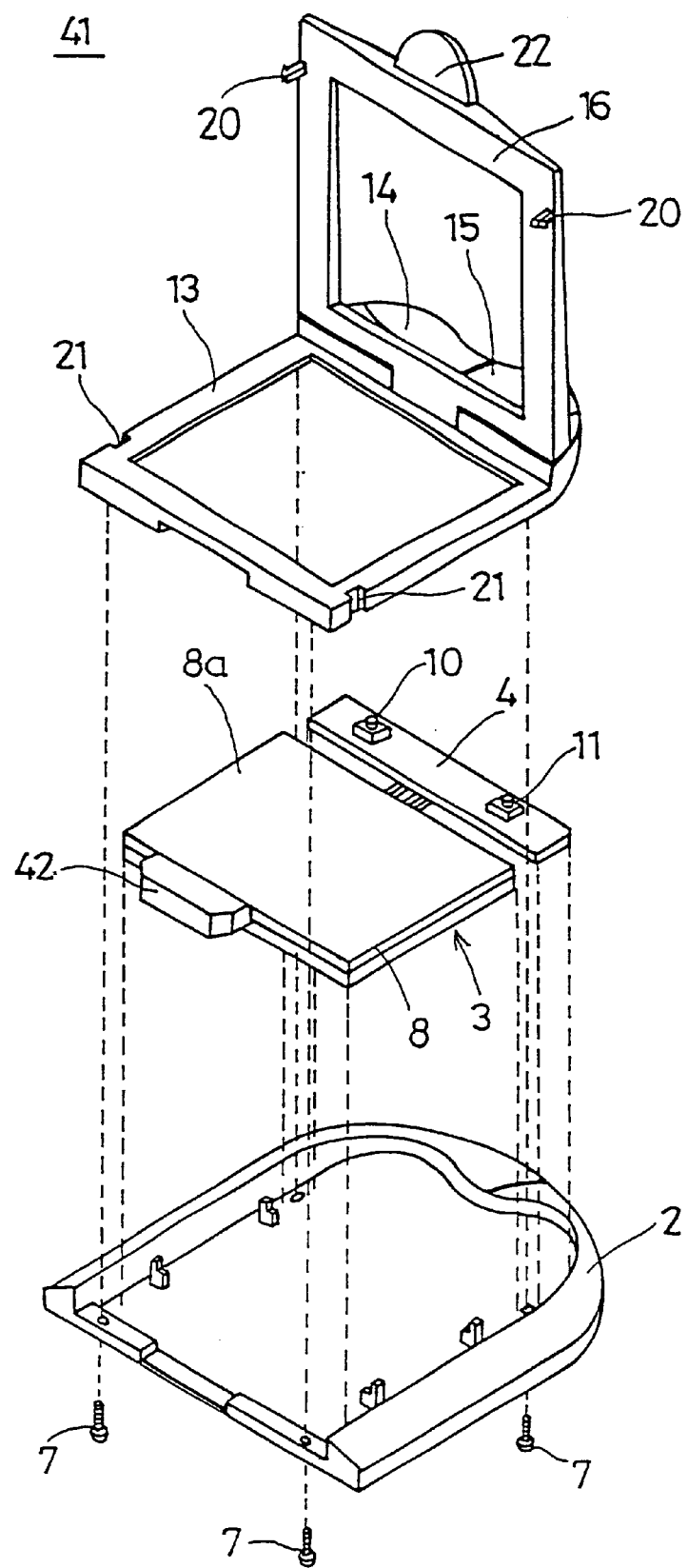
FIG. 17 is an exploded perspective diagram showing the coordinate input device of the third embodiment of the present invention.

FIGS. 15 and 16 are perspective diagrams and FIG. 17 is an exploded perspective diagram showing a coordinate input device of a third embodiment of the present invention. In FIGS. 15 to 17, components similar to those shown in FIG. 1 to 3 are shown by similar reference numerals and further description is omitted.

A coordinate input device 41 of the present embodiment is provided with an infrared beam emitting part 42 on the device main body. The infrared beam emitting part 42 is connected to the computer via an infrared beam receiving part 43. The infrared beam emitting part 42 is connected to the circuit board 3. The coordinate information and the operation information obtained by operations of the coordinate input part 8 or the left and right switches 10, 11 are modulated to predetermined signals and then supplied to the infrared beam emitting part 42. The infrared beam emitting part 42 emits the infrared beam, which corresponds to the modulated signals supplied from the circuit board 3.

Figure 18:
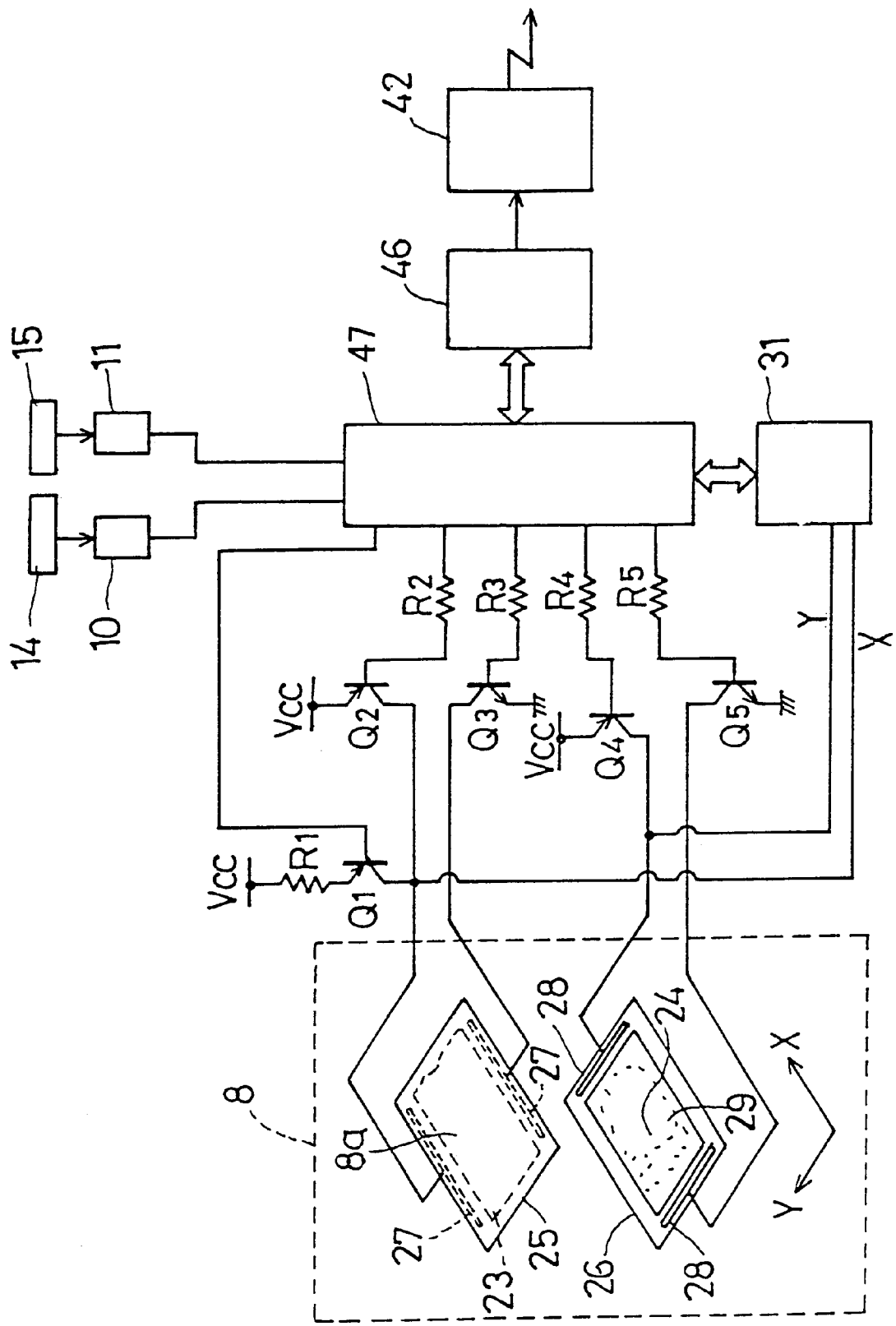
FIG. 18 a schematic diagram showing a circuit board used in the coordinate input device of the third embodiment of the present invention.

FIG. 18 a schematic diagram showing a circuit board used in the coordinate input device of the third embodiment of the present invention. In FIG. 18, components similar to those shown in FIG. 4 are shown by similar reference numerals and further description is omitted.

In the present embodiment, the circuit board 3 is further provided with an infrared beam interface circuit 46. The infrared beam interface circuit 46 modulates the coordinate information and the operation information obtained at a control part 47 by operations of the coordinate input part 8 or the left and right switches 10, 11 into predetermined signals suitable for being emitted as infrared beams. The signals modulated at the infrared beam interface circuit 46 are supplied to the infrared beam emitting part 42.

The infrared beam emitting part 42 drives elements such as an LED corresponding to the signals modulated at the infrared beam interface circuit 46, so as to emit infrared beams corresponding to the signals modulated at the infrared beam interface circuit 46.

The infrared beam receiving part 43 receives the infrared beam emitted from the infrared beam emitting part 42. The infrared beam receiving part 43 converts the received infrared beam into electric signals, demodulates the converted signals and restores the coordinate information and the operation information.

The restored coordinate information and the operation information are delivered to the external connection cable 44. The external connection cable 44 has one end connected to the infrared beam receiving part 43 and the other end connected to a PS/2 port connector 45. The PS/2 port connector 45 is connected to the PS/2 port of the computer. The coordinate information and the operation information restored at the infrared beam receiving part 43 are supplied to the computer via the external connection cable 44.

Thus, a wireless adaptation of the coordinate input device 41 is achieved.

In the first to third embodiments, the PS/2 port is taken as an example of an interface with the computer. However, such interface port is not limited to the PS/2 port, but another interface port, such as an USB can be used.

Also, in the first to third embodiments, the a resistive-film-type input method is used as the coordinate input part. However, such an input method is not limited to the resistive film type, but can be of another input method such as an electrostatic capacitive type and electromagnetic induction type. In other words, the present invention can be applied to any type of a coordinate input part with a flat operation surface.

Also, it is to be noted that the number of microswitches shown in FIG. 10 is not limited to one, but more than one microswitch can be provided. In the following, a coordinate input device of a fourth embodiment will be described which device is provided with a plurality of microswitches and can be used for various applications 60.

Figure 19:
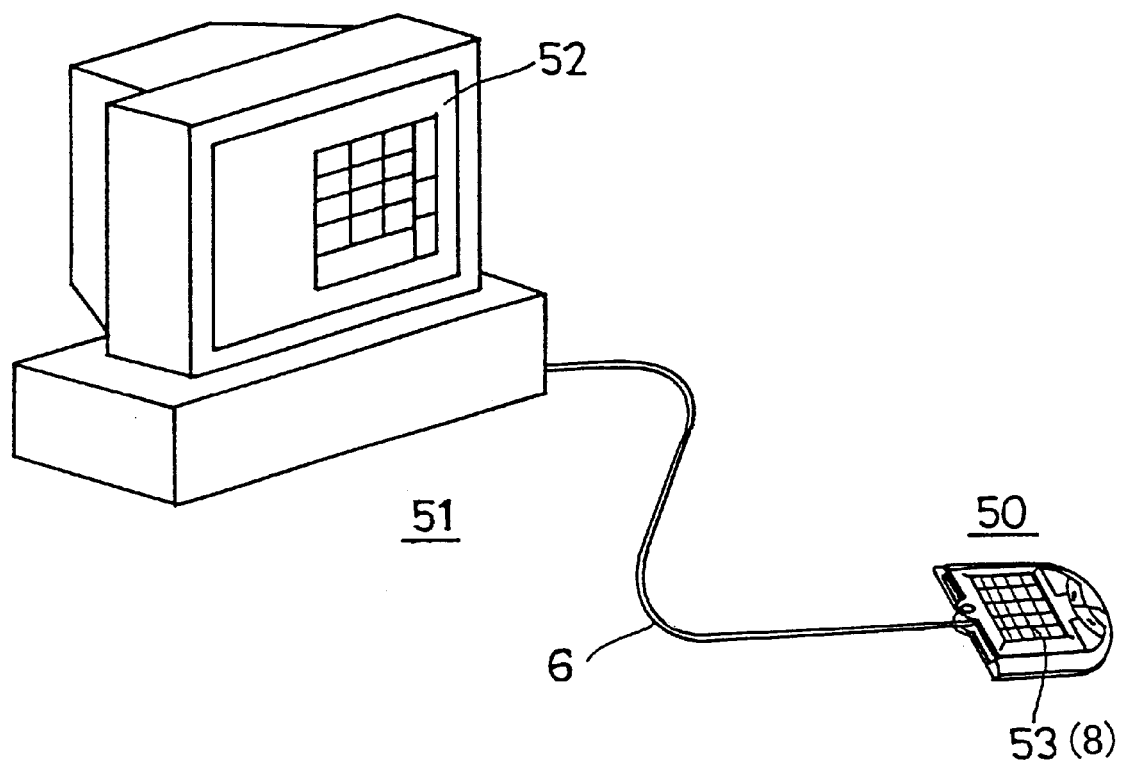
FIG. 19 is a schematic diagram of a coordinate input device of a fourth embodiment of the present invention.

FIG. 19 is a schematic diagram of a coordinate input device of a fourth embodiment of the present invention.

In FIG. 19, a coordinate input device 50 of the present invention is connected to equipment such as a personal computer (PC) 51 via the external connection cable 6.

For example, if a predetermined position of a coordinate input part 8 of the coordinate input device 50 is pressed down, a position corresponding to the predetermined position in an application 60 is displayed on a display device 52 of the PC 51. Thus, coordinate information displayed on the display device 52 is converted into a corresponding value in the application 60. Then, the converted information is processed.

This will be described with reference to FIG. 20, which is a block diagram of the coordinate input device of the fourth embodiment of the present invention.

Figure 20:
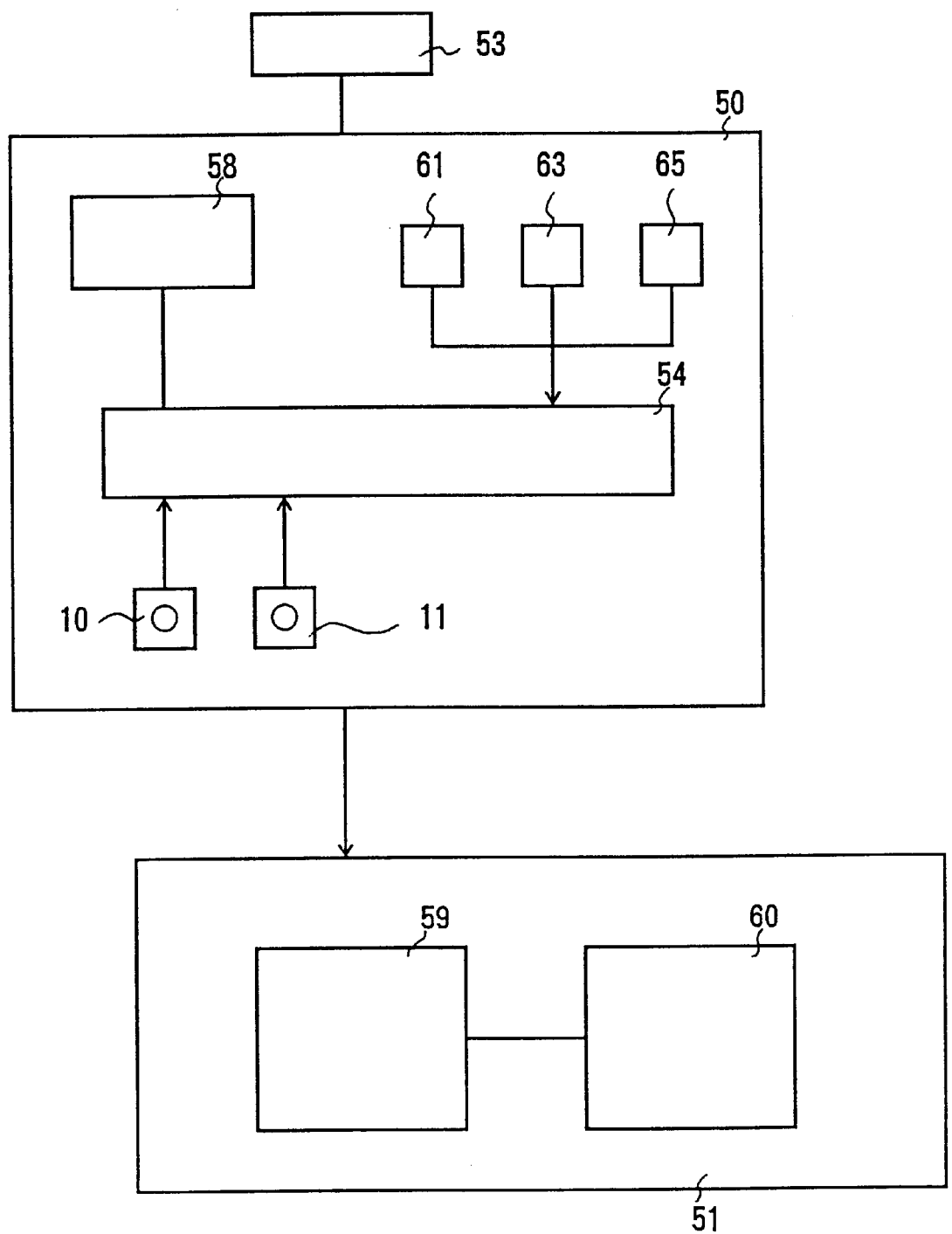
FIG. 20 is a block diagram of the coordinate input device of the fourth embodiment of the present invention.

As shown in FIG. 20, the coordinate input device 50 holds a sheet-like material, such as a removable sheet unit 53. The coordinate input device 50 sends information such as coordinate information and sheet unit information to the PC 51.

The coordinate input device 50 includes microswitches 61, 63, 65, a panel 58, the right switch 10, the left switch 11 and an MCU (micro-control unit) 54.

The microswitches 61, 63, 65 detect the presence of the sheet unit 53, and determine an ON/OFF state in response to the shape of the sheet unit 53. The panel 58 is an operating surface for detecting a pressed position of the panel 53. Also, the pressed position is determined by operating the right switch 10 and/or the left switch 11.

The MCU 54 controls the coordinate input device 50 based on the information input via the microswitches 61, 63, 65, the panel 58, the right switch 10 and the left switch 11.

When the coordinate information and the sheet unit information controlled by the coordinate input device 50 are sent to the PC 51, first, these information are sent to a driver software 59 of the PC 51. The driver software 59 starts up an application 60 according to the thus-input sheet unit information and converts an input coordinate value to a numerical value corresponding to the application 60. The data converted into the numerical value is output to the application 60 and then processed by the application 60.

Thus, the coordinate input device can be adapted to various applications by connecting the coordinate input device to the PC and by using the removable sheet unit 53.

In the following, the coordinate input device of a fourth embodiment of the present invention will be described in detail.

Figure 21:
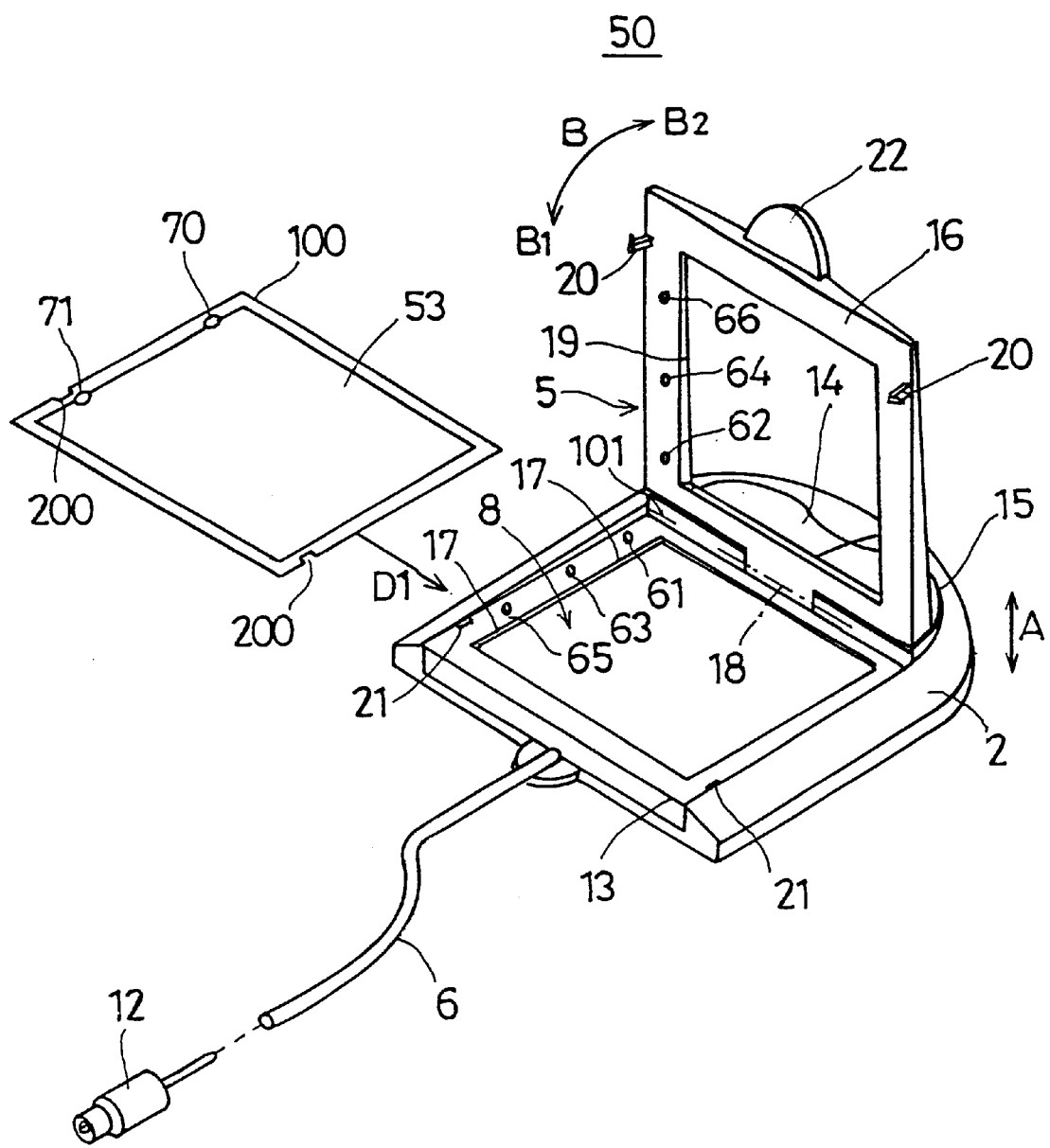
FIG. 21 is a perspective diagram showing the coordinate input device of the fourth embodiment of the present invention, with a flap being shown in an open position.

FIG. 21 is a perspective diagram showing the coordinate input device of the fourth embodiment of the present invention, with a flap being shown in an open position. In FIG. 21, components similar to those shown in FIG. 2 are shown by similar reference numerals and further description is omitted.

In FIG. 21, the sheet unit 53 is slid in the direction shown by an arrow D1 so as to be placed on the coordinate input part 8 and held on the coordinate input device 50. The sheet unit 53 is positioned such that an edge part 100 of the sheet unit 53 coincides with an edge surface 101 of the flap part 16 and that placing notches 200 coincide with the engagement parts 21. Thus, the sheet unit 53 is positioned at a optimal position for enabling an input of desired information.

The coordinate input device 50 is provided with the microswitches 61, 63, 65 on the cover main body 13 and recessed parts 62, 64, 66 on the flap part 16. The microswitches 61, 63, 65 engage with the recessed parts 62, 64, 66.

The sheet unit 53 is provided with anchoring parts 70, 71 such as holes. When the sheet unit 53 is held on the coordinate input device 50, the anchoring parts 70, 71 of the sheet unit 53 engage with the microswitches 61, 65. Therefore, it is only the microswitch 63 which will be pressed by the sheet unit 53 and thus turned on. Accordingly, the microswitches 61, 63, 65 will extend in the corresponding recessed parts 62, 64, 66, respectively, if not obstructed by the sheet unit 53. Then, the ON/OFF state for each microswitch 61, 63, 65 is detected.

Thus, the positions and number of the anchoring parts in the sheet unit 53 determine a number of microswitches 61, 63, 65 to be pressed. Accordingly, various combinations of ON/OFF states of the microswitches 61, 63, 65 can be obtained.

That is to say, by providing different positions and numbers of anchoring parts for different types of sheet units 53, the type of sheet unit 53 used can be determined by detecting the ON/OFF states of the microswitches 61, 63, 65.

Also, configurations of the anchoring parts 70, 71 are not limited to holes but other configurations such as notches can be used.

In the following, an internal structure of the coordinate input device 50 of the fourth embodiment of the present invention will be described.

Figure 22:
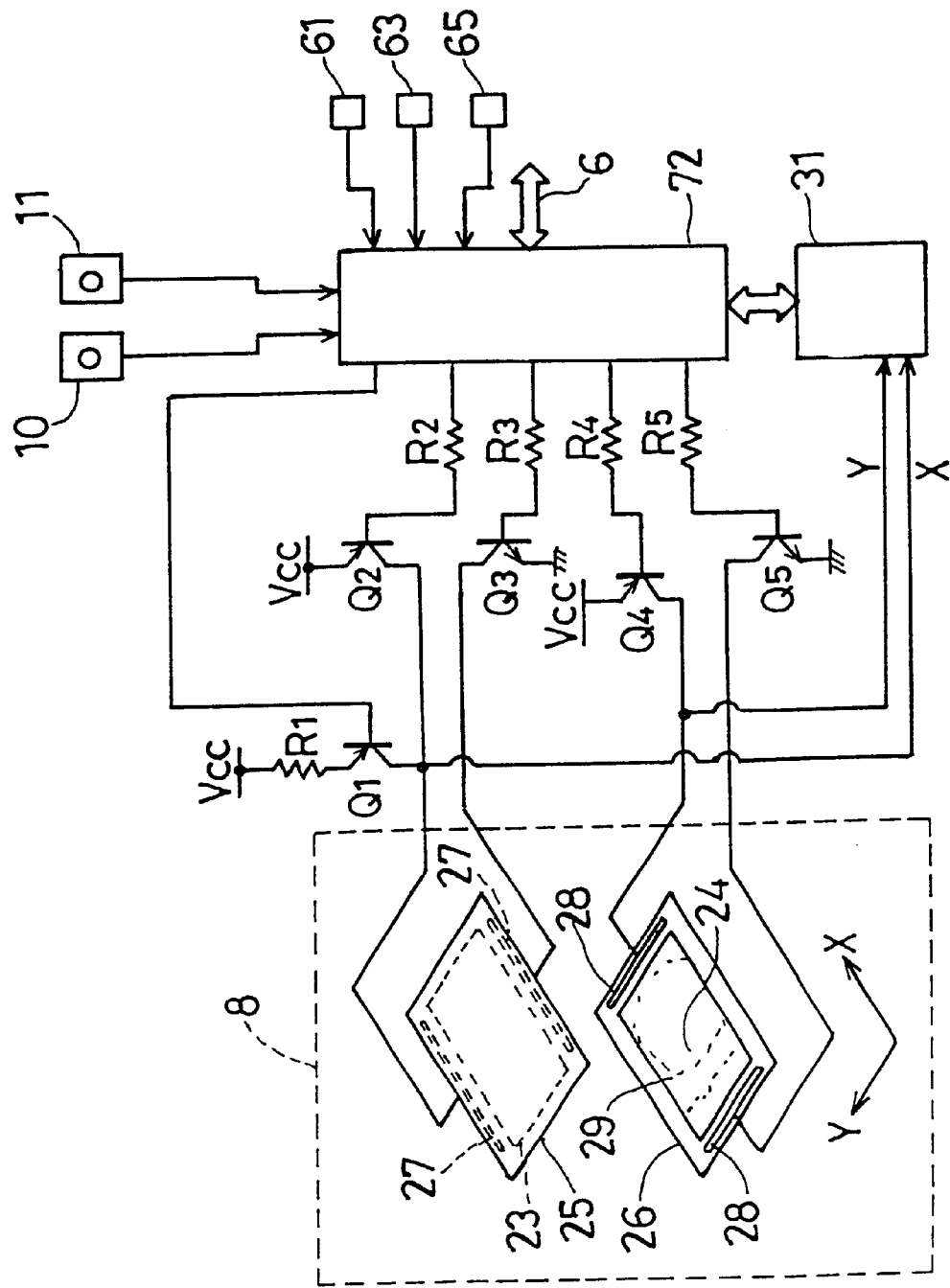
FIG. 22 is a schematic diagram showing a circuit board used in the coordinate input device of the fourth embodiment of the present invention.

FIG. 22 is a schematic diagram showing a circuit board used in the coordinate input device of the fourth embodiment of the present invention. In FIG. 22, components similar to those shown in FIG. 4 are shown by similar reference numerals and further description is omitted.

In FIG. 22, the microswitches 61, 63, 65 are connected to a control part 72. The control part 72 switches the applications 60 according to the ON/OFF states of the microswitches 61, 63, 65. For example, when only the microswitch 61 is ON, an application 60 predetermined for the situation where the microswitches 63, 65 are OFF and the microswitch 61 is ON is started up.

That is to say, the PC 51 receives information for switching the applications 60 in accordance with the sheet unit 53 held on the coordinate input device 50, so that the coordinate input device 50 is operable according to the relevant application 60.

The following description relates to the coordinate input device holding the sheet unit 53 and thus being ready to accept an input thereon.

Figure 23:
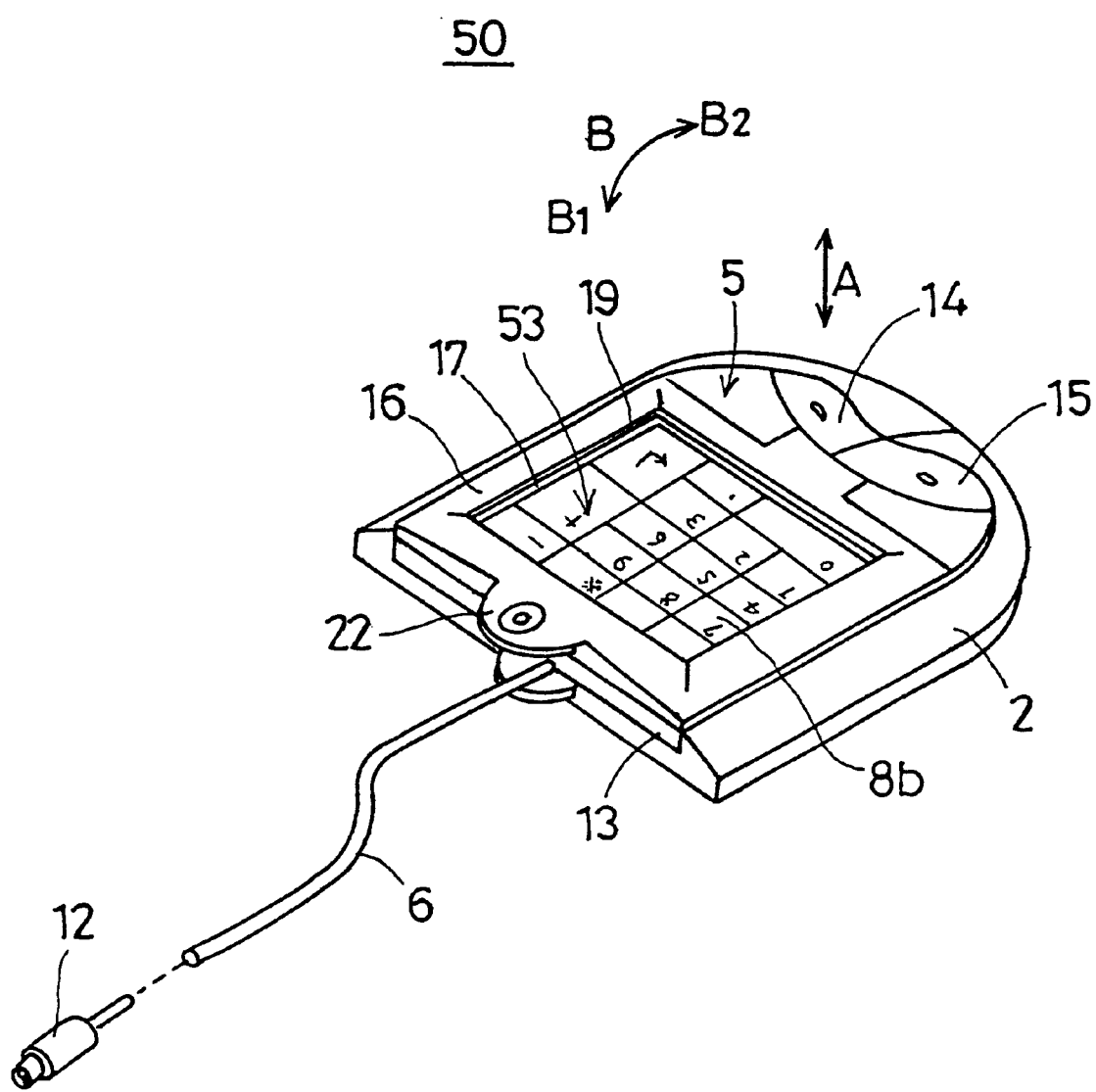
FIG. 23 is a perspective diagram showing the coordinate input device of the fourth embodiment of the present invention, with a sheet unit held thereon.

FIG. 23 is a perspective diagram showing the coordinate input device of the fourth embodiment of the present invention, with a sheet unit held thereon. In FIG. 23, components similar to those shown in FIG. 1 are shown by similar reference numerals and further description is omitted.

FIG. 23 is a diagram showing the coordinate input device 50 with the sheet unit 53 held thereon. When the sheet unit 53 is held on the coordinate input device 50, an operation surface 8b on the upper surface of the sheet unit 53 corresponds to the operation screen (see FIG. 19) of the application 60 of the PC. For example, the operation surface 8b is provided with symbols showing a ten-key pad. In an input operation, the user presses a symbol at a predetermined position on the operation surface 8b. Therefore, in order to output the symbols of the ten-key pad, a process is carried out in the absolute value mode in which the position on the coordinate is represented as an absolute position. Thus, since the numerical value of the symbols and the coordinate of a predetermined position correspond to each other in the absolute value mode, the coordinate input device can be used as a ten-key pad.

Figure 24:
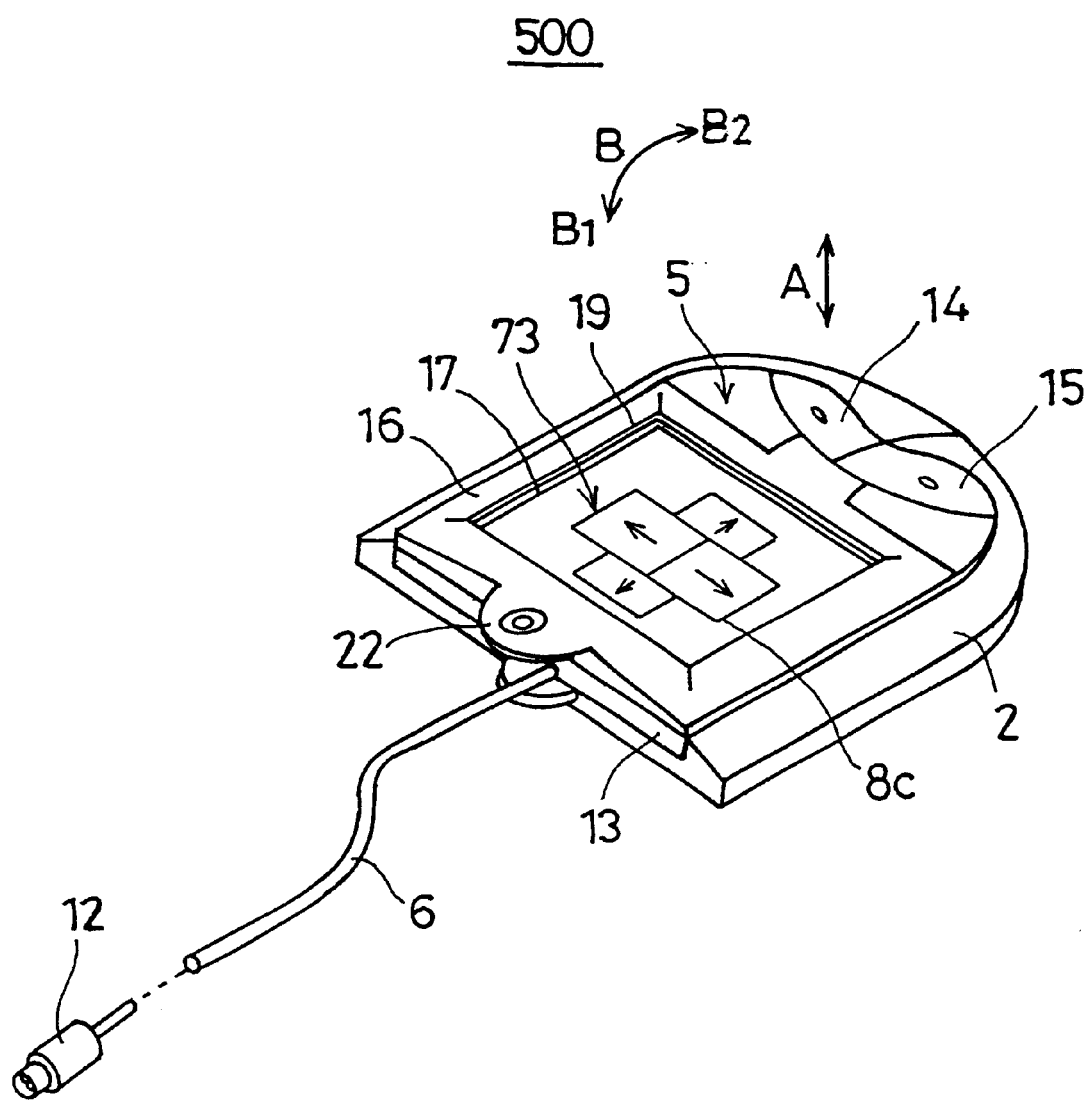
FIG. 24 is a perspective diagram showing the coordinate input device of the fourth embodiment of the present invention, with another type of sheet unit held thereon.

FIG. 24 is a perspective diagram showing the coordinate input device of a fourth embodiment of the present invention, with another type of sheet unit held thereon. In FIG. 24, components similar to those shown in FIG. 1 are shown by similar reference numerals and further description is omitted.

FIG. 24 is a diagram showing a coordinate input device 500 with a sheet unit 73 held thereon. When the sheet unit 73 is held on the coordinate input device 500, the application 60 of the PC carries out an operation corresponding to an operation surface 8c at an upper surface of the sheet unit 73. For example, the operation surface 8c is provided with symbols showing arrows for moving a cursor. In an input operation, the user presses a symbol at a predetermined position on the operation surface 8c. Therefore, in order to move the cursor, a process is carried out in the absolute value mode in which the position on the coordinate is represented as an absolute position. Thus, since the numerical value of the symbols and the coordinate of a predetermined position correspond to each other in the absolute value mode, the coordinate input device can be used as direction keys for moving a cursor.

In the following, an operation of the coordinate input device 50 shown in FIG. 23 will be described with the sheet unit 53 being held thereon.

Figure 25:
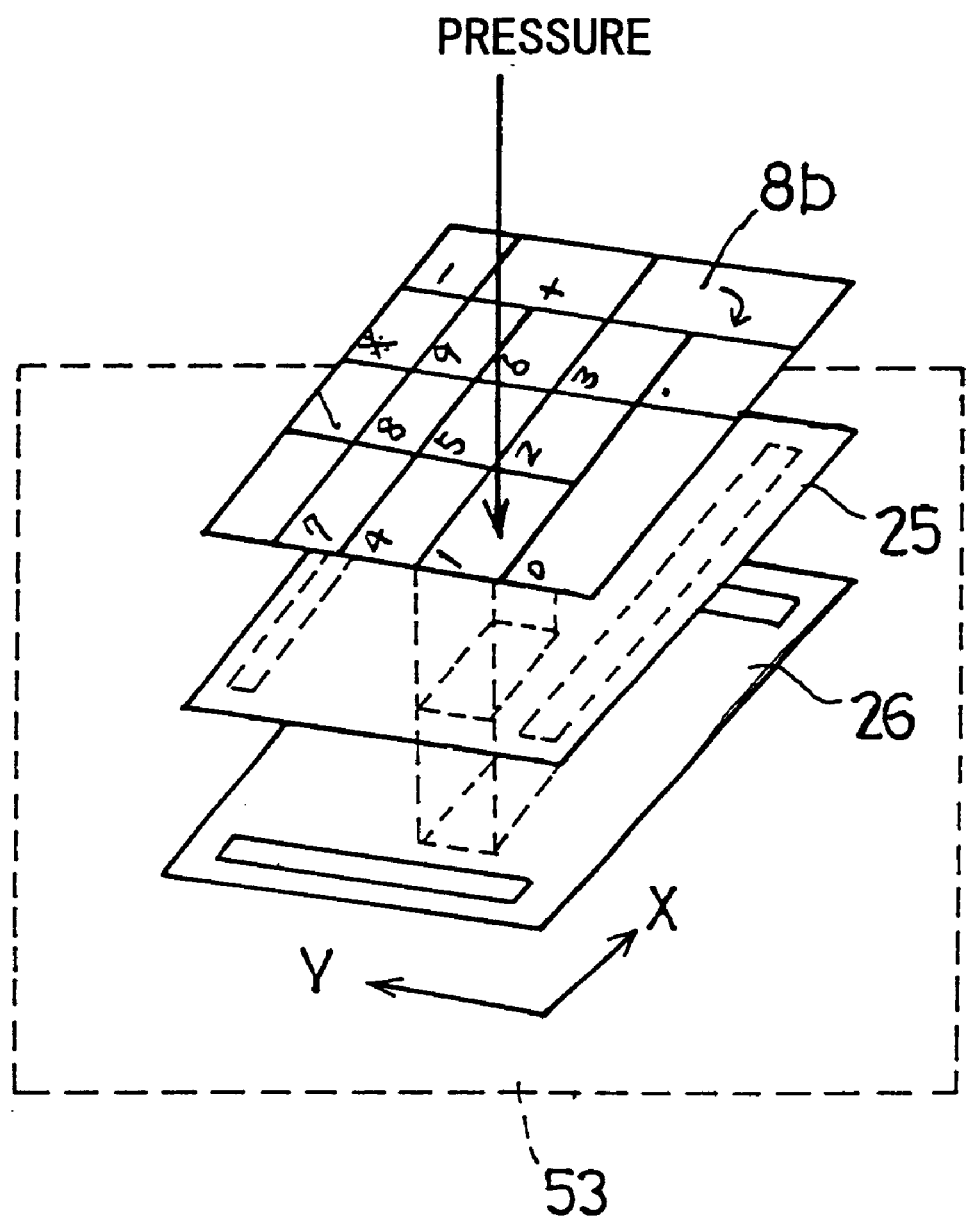
FIG. 25 is an exploded perspective diagram showing the coordinate input device of the fourth embodiment of the present invention.

FIG. 25 is an exploded perspective diagram showing the coordinate input device of the fourth embodiment of the present invention.

As shown in FIG. 25, the sheet unit 53 includes the PET films 25, 26 and the operation surface 8b. When a symbol "1" on the operation surface 8b is pressed down in a direction of an arrow, regions of the PET films 25, 26 corresponding to the symbol "1" will be in contact and the voltage division ratio is altered. The contact position is then detectable by measuring this voltage division ratio.

In the following, a process flow of a method of detecting the contact position will be described.

Figure 26:
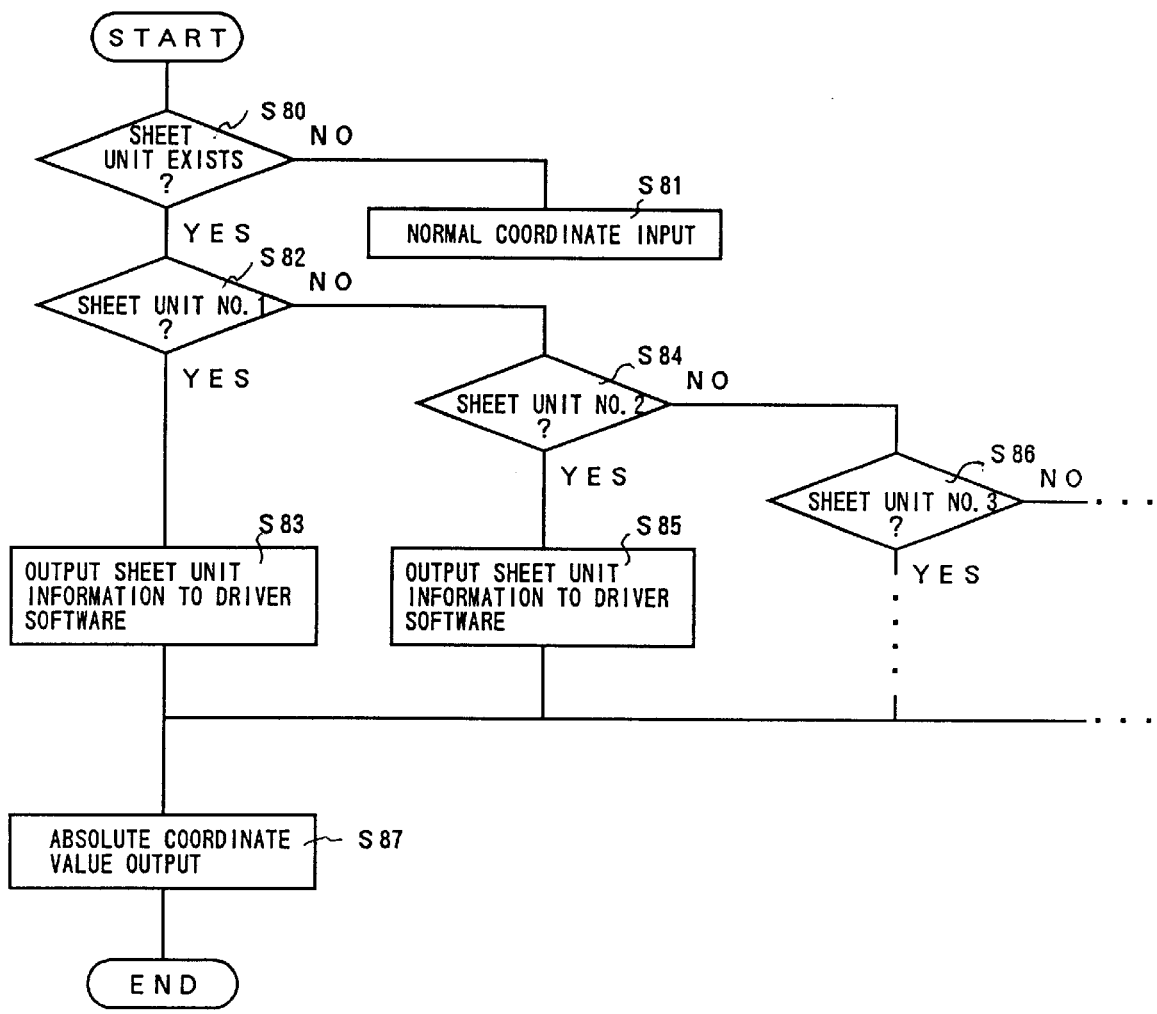
FIG. 26 is a flowchart related to an absolute coordinate value output operation of the present invention.

FIG. 26 is a flowchart related to an absolute coordinate value output operation of the present invention.

First, it is determined whether a sheet unit is held on the coordinate input device (step S80). If the sheet unit exists on the coordinate input device (step S80, YES), a type of the sheet unit (e.g., type No. 1) is determined (step S82). In order to determine the type of the sheet unit, ON/OFF states of the microswitches of the coordinate input device are detected by means of holes provided on the sheet unit with predetermined patterns.

If the sheet unit does not exist on the coordinate input device (step S80, NO), the coordinate input device operates in a normal relative value mode and the coordinate input value is output to the driver software of the PC. If the sheet unit is of type No. 1 (step S82, YES), the coordinate input device outputs sheet unit information of type No. 1 to the driver software (step S83). After a process corresponding to the sheet unit information of type No. 1 is carried out by the driver software, an absolute coordinate value is outputted from the coordinate input device (step S87).

If the sheet unit is of type No. 2 (step S84, YES), the coordinate input device outputs sheet unit information of type No. 2 to the driver software (step S85). After a process corresponding to the sheet unit information of type No. 2 is carried out by the driver software, an absolute coordinate value is output from the coordinate input device (step S87).

Thus, processing information corresponding to each type of sheet unit is supplied to the driver software on the PC and the absolute coordinate is output.

In the following, processes carried out by the above-described driver software and the application 60 will be described.

Figure 27:
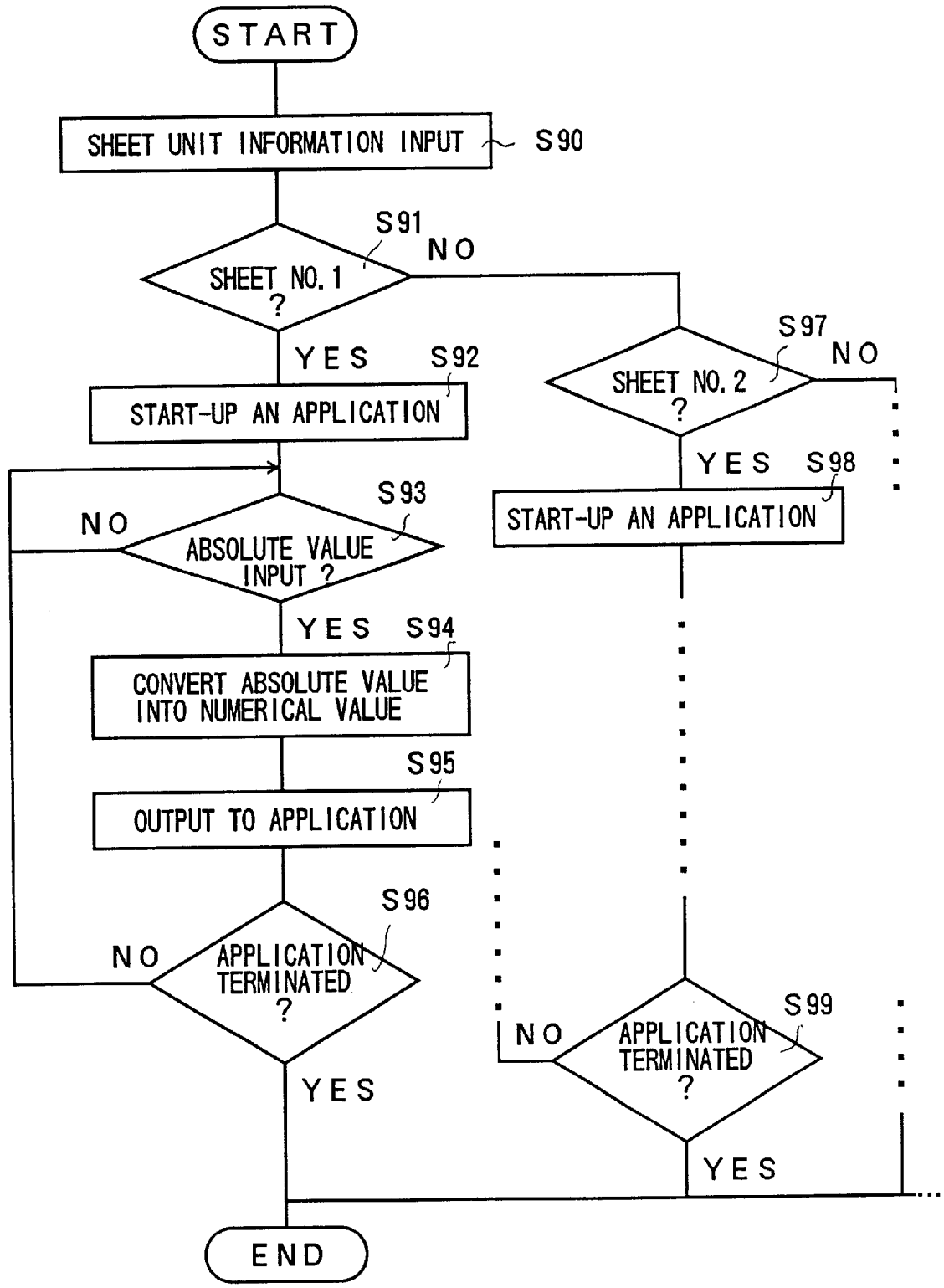
FIG. 27 is a flowchart showing processes carried out on a PC.

FIG. 27 is a flowchart showing processes carried out on the PC.

In FIG. 27, the PC receives sheet unit information input from the coordinate input device (step S90). Then the PC determines the type of sheet unit from the received sheet unit information (step S91). For example, if the sheet unit is of type No. 1 (step S91, YES), an application 60 corresponding to the detected sheet unit type is started up on the PC (step S92).

Then, with the application 60 being started up, it is determined whether or not an absolute value is inputted (step S93). If the absolute value is input to the PC (step S93, YES), the following processes are carried out. First, the absolute value input to the driver software is converted to a numerical value corresponding to the application 60 (step S94). The converted numerical value is output to the application 60 and processes are carried out by the application 60 (step S95). When the processes on the application 60 are terminated (step S96, YES), the processes on the PC are terminated. If the processes on the application 60 have not been terminated (step S96, NO), it is determined again whether or not an absolute value is input (step S93).

Also, if the sheet unit is of type No. 2 (step S97, YES), an application 60 corresponding to the detected sheet unit type is started up on the PC (step S98). Then, similar processes to those described above are carried out, and it is determined whether or not the application 60 has been terminated (step S99). Thus, the PC also carries out the processes corresponding to the application 60 according to the detected sheet unit information for other types of sheet units.

In the following, a variant of the fourth embodiment of the present invention will be described.

Figure 28:
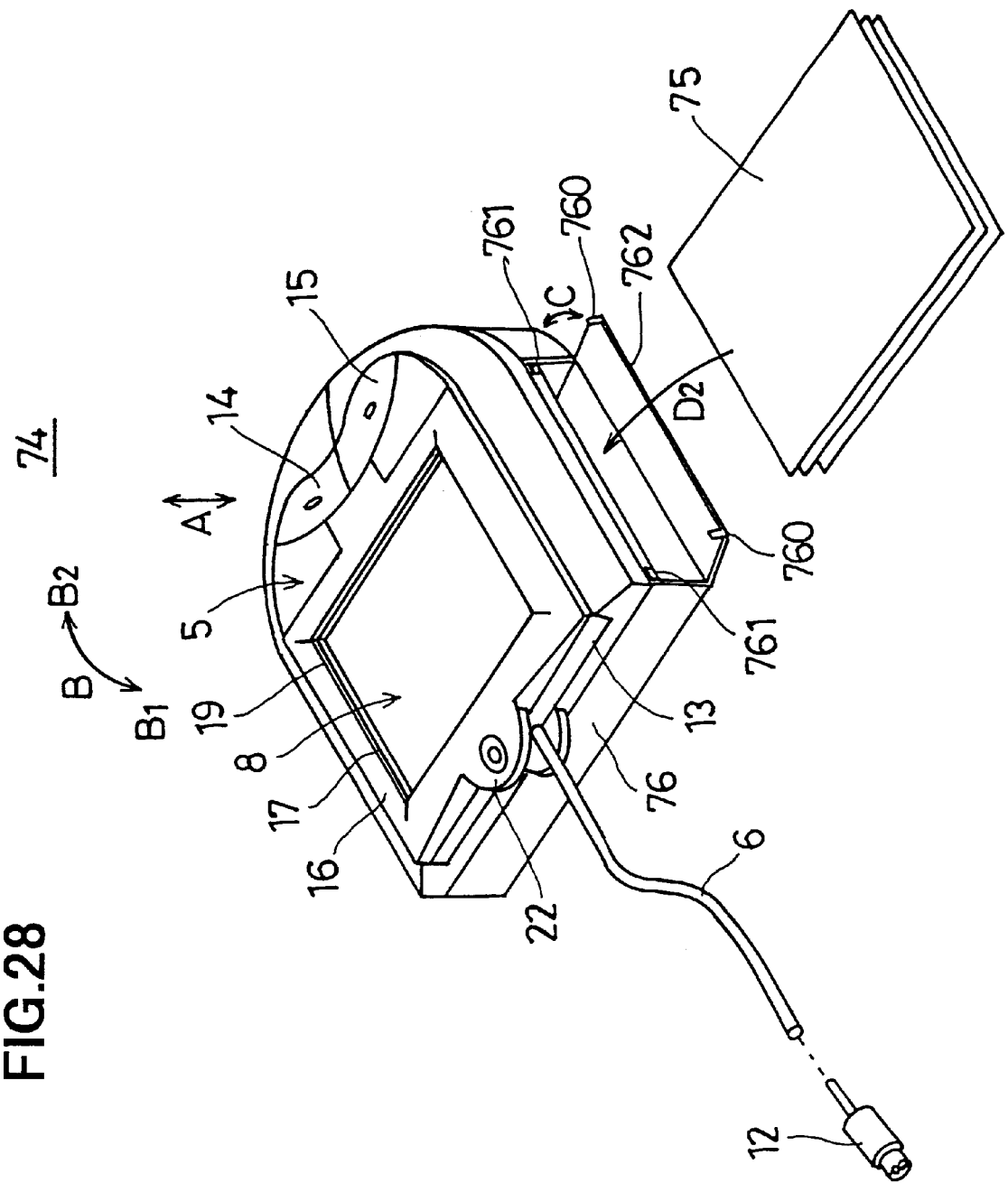
FIG. 28 is a perspective diagram showing the coordinate input device of a first variant of the fourth embodiment of the present invention.

FIG. 28 is a perspective diagram showing the coordinate input device of a first variant of the fourth embodiment of the present invention. In FIG. 28, components similar to those shown in FIG. 1 are shown by similar reference numerals and further description is omitted.

In FIG. 28, a coordinate input device 74 is provided with an accommodation part 76 which can receive the sheet unit 75. The sheet units 75 currently not held on the operation part 8 are accommodated in the accommodation part 76 in a direction shown by an arrow D2. The accommodation part 76 is provided with a hinged plate 762 which can be opened and closed in directions shown by an arrow C. The hinged plate 762 is provided with hooks 760 which respectively engage with an engagement part 761.

Since one or more of the sheet units 75 currently not in use can be accommodated in the accommodation part 76 provided in the coordinate input device 74, improved operability of the coordinate input device can be achieved.

Figure 29:
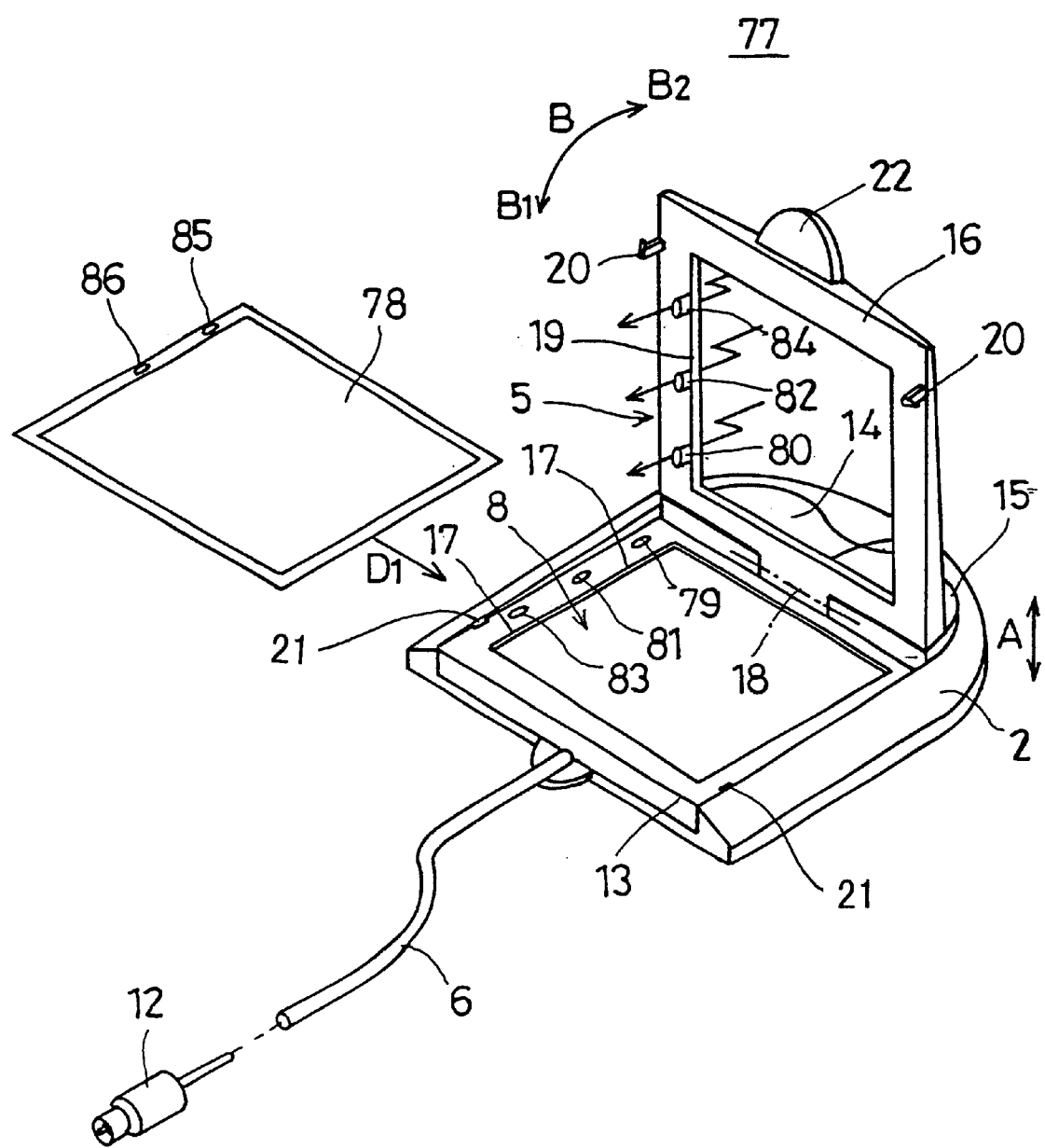
FIG. 29 is a perspective diagram showing the coordinate input device of a second variant of the fourth embodiment of the present invention.

FIG. 29 is a perspective diagram showing the coordinate input device of a second variant of the fourth embodiment of the present invention. In FIG. 29, components similar to those shown in FIG. 2 are shown by similar reference numerals and further description is omitted.

In FIG. 29, a coordinate input device 77 of the present invention is provided with photocouplers 79, 81, 83 instead of the microswitches, and also provided with through-holes 80, 82, 84 on the flap part 16 at positions opposing the photocouplers 79, 81, 83. A sheet unit 78 is placed on the coordinate input part 8 in a direction shown by an arrow D1, such that the coordinate input device 77 holds the sheet unit 78. The sheet unit 78 is provided with openings 85, 86. When the sheet unit 78 is held on the coordinate input device 77, the openings 85, 86 of the sheet unit 78 are placed opposite the photocouplers 79, 81, 83.

The photocouplers 79, 81, 83 receive light in a similar manner to that described above with reference to FIGS. 13 and 14A, 14B. In the present embodiment, since the photocoupler 83 is covered with the sheet unit 78, the light is received by the photocoupler 83. That is to say, the photocoupler 83 is in an ON state. The ON/OFF states of the photocouplers 79, 81, 83 are detected in this manner.

Thus, the positions and number of the holes in the sheet unit 78 determine the ON/OFF states of the photocouplers 79, 81, 83. Accordingly, various combinations of ON/OFF states of the photocouplers 79, 81, 83 can be obtained.

That is to say, by providing different positions and numbers of holes for different types of sheet units 78, the type of sheet unit 78 used can be determined by detecting the ON/OFF states of the photocouplers 79, 81, 83.

Also, configurations of the holes 85, 86 are not limited to holes but other configurations such as notches can be used.

Figure 30:
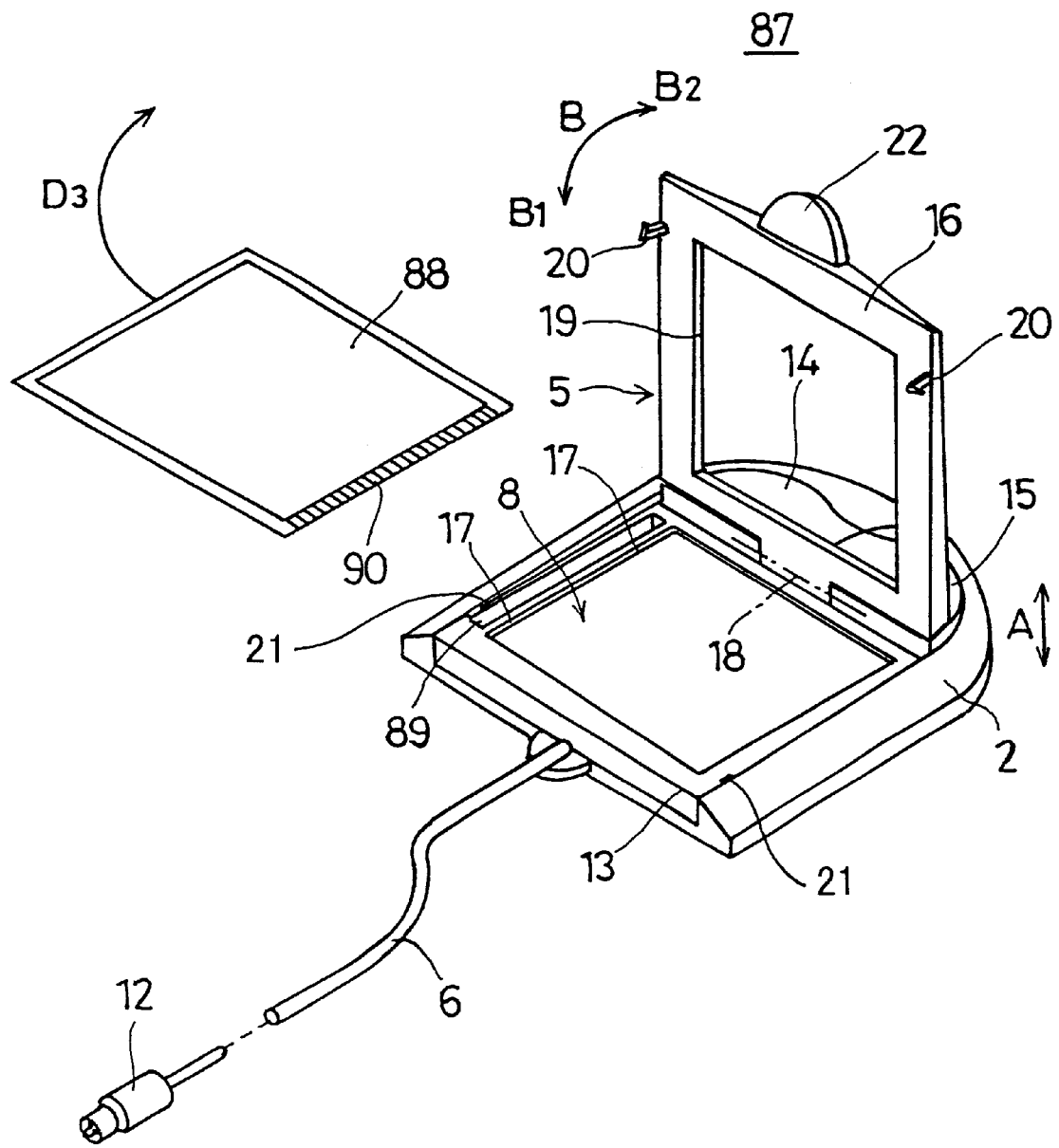
FIG. 30 is a perspective diagram showing the coordinate input device of a third variant of the fourth embodiment of the present invention.

FIG. 30 is a perspective diagram showing the coordinate input device of a third variant of the fourth embodiment of the present invention. In FIG. 30, components similar to those shown in FIG. 2 are shown by similar reference numerals and further description is omitted.

In FIG. 30, a sheet unit 88 is placed on the coordinate input part 8 in a direction shown by an arrow D3, such that the coordinate input device 87 holds the sheet unit 88. The sheet unit 88 is provided with a bar code 90. The coordinate input device 87 is provided with a bar code reader 89 provided on the cover main body 13. The bar code reader 89 reads the bar code 90 provided on the sheet unit 88 and determines the type of the sheet unit 88.

Thus, instead of using the microswitches, the type of sheet unit can be determined using the bar code and bar code reader, and thereby various applications 60 can be used.

Figure 31:
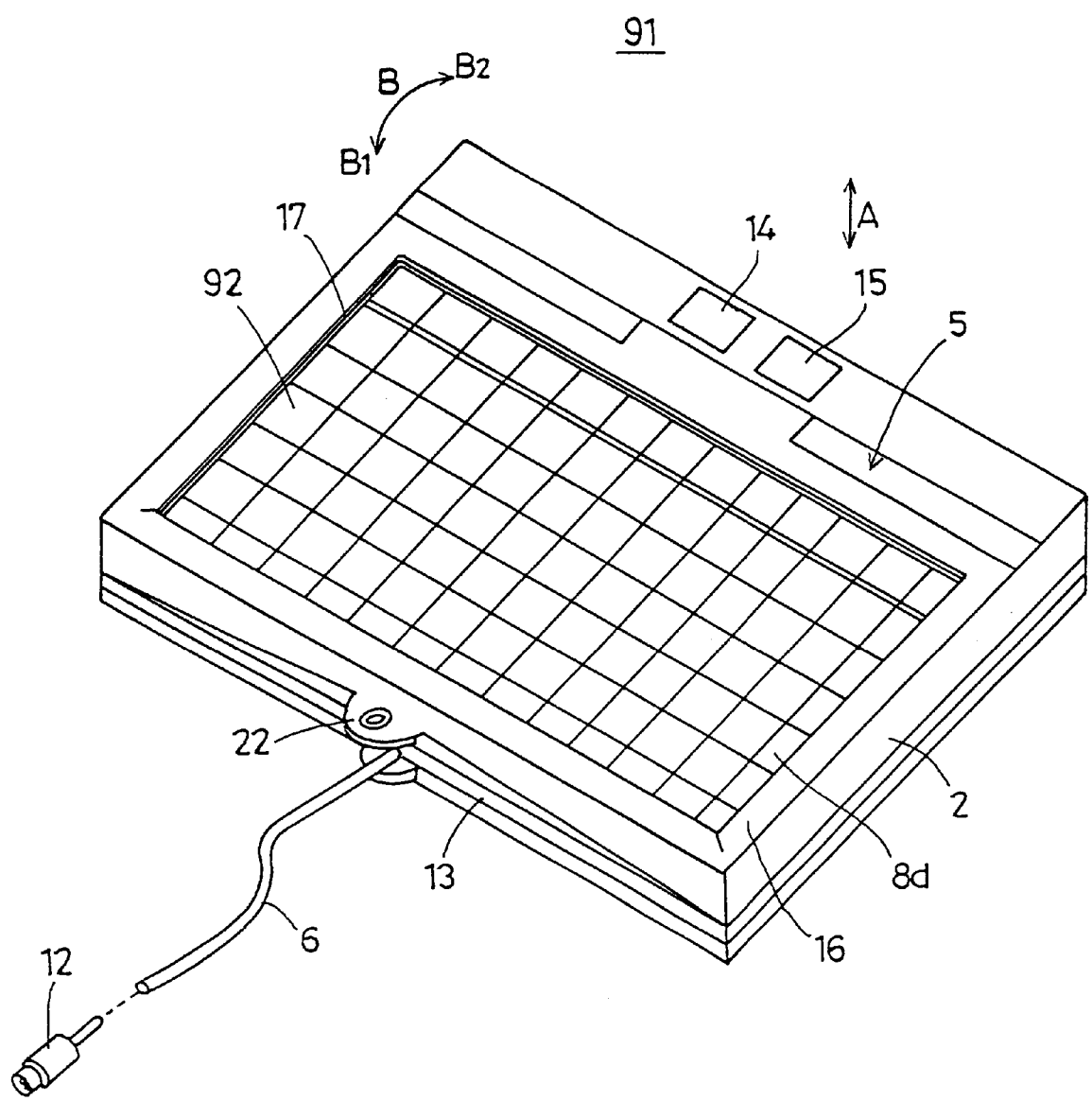
FIG. 31 is a perspective diagram showing the coordinate input device of a fourth variant of the fourth embodiment of the present invention.

FIG. 31 is a perspective diagram showing the coordinate input device of a fourth variant of the fourth embodiment of the present invention. In FIG. 30, components similar to those shown in FIG. 1 are shown by similar reference numerals and further description is omitted.

In FIG. 31, a coordinate input device 91 holds a sheet unit 92. Thus, an operation surface 8d on the upper surface of the sheet unit 92 corresponds to the operation of the application 60 of the PC. For example, the operation surface 8d is provided with symbols corresponding to a keyboard. Thus, using the coordinate input device 91 corresponding to the size of the keyboard and by pressing a certain symbol on the operation surface 8d, the symbol is made to correspond with a predetermined position on the keyboard. Thereby, the coordinate input device 91 can be used as a keyboard.

Figure 32:
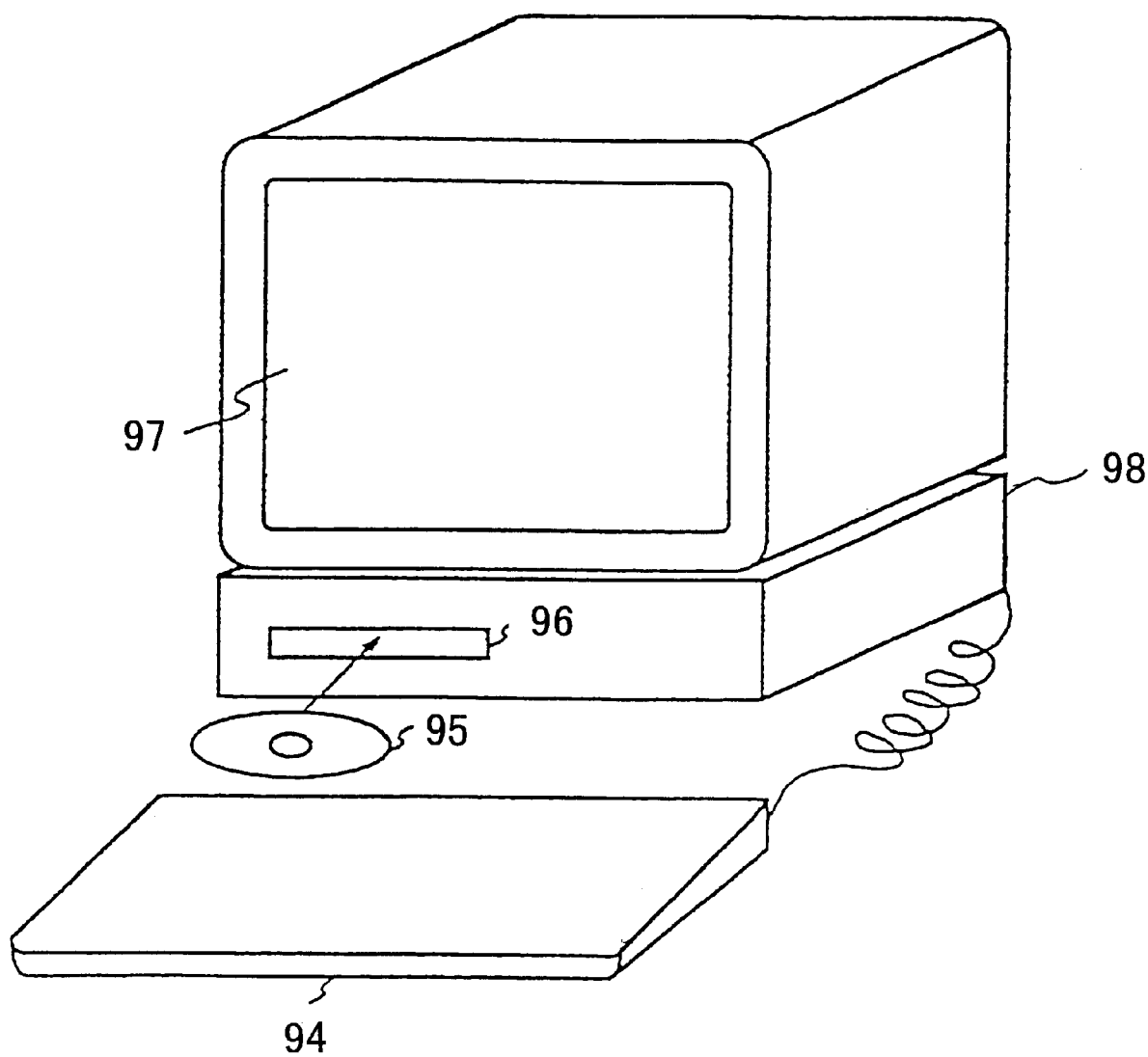
FIG. 32 is a perspective view of a general purpose computer that is specially configured by executing software stored on a computer-usable medium.

The present invention can be practiced using a general purpose computer that is specially configured by software executed thereby to carry out the functions described above. FIG. 32 is a perspective view of a general purpose computer that is specially configured by executing software stored on a computer-usable medium. The computer includes a coordinate input device 94 of the present invention, a CD-ROM drive 96, a computer main body 98 and a display 97.

Program code instructions are stored on the CD-ROM 95 which are read by the CD-ROM drive 72. The instructions are process in the computer main body 98. The CD-ROM 95 corresponds to the "processor readable medium" in claims. The term "processor readable medium" includes any instruction storage device, such as, magnetic disks (floppy disks), optical disks including DVDs, magneto optical disks such as MOs, semiconductor memory cards such as PC cards and other types of computer-readable devices and media.

Further, the present invention is not limited to these embodiments, but variations and modifications may be made without departing from the scope of the present invention.

The present application is based on Japanese priority application No. 11-116835 filed on Apr. 23, 1999, and on Japanese priority application No. 11-274665 filed on Sep. 28, 1999, the entire contents of which are hereby incorporated by reference.

What is claimed is:

1. A coordinate input device outputting information to an external device, the coordinate input device comprising:

a coordinate detecting part detecting a position of a touch on an operation surface, as coordinate information, so as to generate a signal corresponding to the coordinate information of said position to be used by the external device; and a holding part having an opening and being capable of holding an inscribable sheet-like material on said operation surface, said sheet-like material being accessible through said opening, wherein by producing said touch on said operation surface, the signal corresponding to said coordinate information is generated while preserving inscribed marks corresponding to the touch on the operation surface on said inscribable sheet-like material;

a detecting mechanism detecting whether or not said sheet-like material is placed on said operation surface; and a control part switching processing modes of said coordinate information in response to a result of detection by said detecting mechanism, wherein, if said detecting mechanism detects that said sheet-like material is not present on said operation surface, said control part operates in a relative value mode in which the coordinate information is recognized as a relative value, and, if said detecting mechanism detects that said sheet-like material is present on said operation surface, said control part operates in an absolute value mode in which the coordinate information is recognized as an absolute value such that the coordinate input device selectively outputs information according to one of the relative value mode and the absolute value mode.

2. The coordinate input device as claimed in claim 1, wherein said holding part is urged toward said operation surface to hold said sheet-like material between said holding part and a peripheral part of said operation surface.

3. The coordinate input device as claimed in claim 2, wherein said holding part is pivotable between a closed position on an open position about an axis provided at one side of said peripheral part and extending parallel to said operation surface, so that, in said closed position, said sheet-like material is held between said holding part and said operation surface, and, in said open position, said sheet-like material is removable from the coordinate input device.

4. The coordinate input device as claimed in claim 1, wherein said operation surface is provided at a position in which the sheet-like material does not contact the operation surface when said sheet-like material is held by said holding part.

5. The coordinate input device as claimed in claim 1, further comprising a wireless transmitting part transmitting the signal corresponding to said coordinate information in a wireless manner.

6. The coordinate input device as claimed in claim 5, further comprising a wireless receiving part connected to the external device, said wireless receiving part receiving the signal corresponding to said coordinate information transmitted from said wireless transmitting part and supplying the signal corresponding to said received coordinate information to said external device.

7. The coordinate input device as claimed in claim 1, wherein said coordinate detecting part includes:

a first film material provided with a first resistive film formed thereon;

a second film material provided with a second resistive film formed thereon and positioned against the first film material such that the first and second resistive films oppose each other; and a voltage detecting circuit detecting voltages at a contact point between said first and second resistive films.

8. A coordinate input device outputting information to an external device, the coordinate input device comprising:

a coordinate detecting part detecting a position of a touch on an operation surface, as coordinate information of the position, and supplying a signal corresponding to the coordination information of said position to be used by the external device;

a processing circuit processing said coordination information;

a holding part having an opening and being capable of holding an inscribable sheet-like material on said operation surface, said sheet-like material being accessible through said opening;

a detecting mechanism detecting a presence or a type of said sheet-like material placed on said operation surface; and a switching information generating part generating switching information used for switching processing functions in response to a result obtained from said detecting mechanism, wherein by producing said touch on said operation surface, the signal corresponding to said coordinate information is supplied while preserving inscribed marks corresponding to the touch on the operation surface on said inscribable sheet-like material, and wherein, if said detecting mechanism detects that said sheet-like material is not present on said operation surface, said control part operates in a relative value mode in which the coordinate information is recognized as a relative value, and, if said detecting mechanism detects that said sheet-like material is present on said operation surface, said control part operates in an absolute value mode in which the coordinate information is recognized as an absolute value such that the coordinate input device selectively outputs information according to one of the relative value mode and the absolute value mode.

9. The coordinate input device according to claim 8, wherein said detecting mechanism is provided with a plurality of detecting elements and detects the presence of and, if present, the type of said sheet-like material according to a type of combination of detection states of said detecting elements.

10. The coordinate input device according to claim 8, further comprising a process-specific input information generating circuit generating coordinate information specific to the processing function which process-specific input information is determined according to a result obtained from said detecting mechanism and the coordinate information obtained by touching said operation surface via said sheet-like material.

11. The coordinate input device according to claim 9, wherein said plurality of detecting elements are configured as a plurality of switches turned ON and OFF according to the type of said sheet-like material.

12. The coordinate input device according to claim 9, wherein said plurality of detecting elements are configured as a plurality of photocouplers outputting detection signals according to the type of said sheet-like material.

13. The coordinate input device according to claim 8, wherein said detecting mechanism is provided with a bar code reader reading a pattern of a bar code which is predetermined according to the type of said sheet-like material.

14. The coordinate input device according to claim 10, wherein said sheet-like material is provided with operation symbols corresponding to said processing function, and said coordinate input device further comprises a positioning part positioning said sheet-like material such that said process-specific input information corresponds to said operation symbol at said position of said touch.

15. The coordinate input device according to claim 10, wherein said input information generating circuit recognizes, as an absolute value, the coordinate on said operation surface corresponding to a position at which said sheet-like material is touched, and implements processes related to said specific coordinate information.

16. The coordinate input device according to claim 1, further comprising an accommodation part in which one or more of said sheet-like materials is accommodatable.

17. A computer readable storage controlling a computer to implement various processes corresponding to types of sheet-like material held on an operation surface, while preserving inscribed marks corresponding to the touch on the operation surface on said inscribable sheet-like material, by:

detecting a presence of and, if present, a type of a sheet-like material held on an operation surface;

starting up one of processing functions according to a result of the detecting said presence such that if the presence of said sheet-like material on said operation surface is not detected, starting up the one processing function in a relative value mode in which the coordinate information is recognized as a relative value, and if the presence of said sheet-like material on said operation surface is detected, starting the one processing function in an absolute value mode in which the coordinate information is recognized as an absolute value;

detecting coordinate information of a position of a touch on said operation surface;

converting said coordinate information into an input signal to be input to said processing function; and outputting said input signal to said processing function started up by said starting up, said outputting selectively outputting information according to one of the relative value mode and the absolute value mode.

18. The coordinate input device according to claim 1, wherein, if said control part operates in a relative value mode, the coordinate input device operates as a flat-type pointing device, and if said control part operates in an absolute value mode, the coordinate input device operates as a writing input device.

* * * * *